United States Patent [19]

Ohno et al.

[11] Patent Number: 4,769,110

[45] Date of Patent: Sep. 6, 1988

[54] ADDRESS LABEL PREPARATION PROCESSING SYSTEM FOR PRINTED MATTER DISPATCHING OPERATION

[75] Inventors: Kinichiro Ohno; Katsuyoshi Morita, both of Tokyo; Kazuo Aihara, Kanagawa; Yukio Kanzaki, Kanagawa; Hirobumi Watanabe, Kanagawa; Hiroshi Ikeda, Tokyo; Kouichi Okamoto, Kanagawa, all of Japan

[73] Assignee: Tokyo Kikai Seisakusho, Ltd., Japan

[21] Appl. No.: 7,927

[22] Filed: Jan. 28, 1987

[51] Int. Cl.[4] .............................................. G06F 15/20

[52] U.S. Cl. .................................... 156/350; 156/384; 156/360; 209/900

[58] Field of Search ............... 156/353, 361, 502, 360; 209/584, 900; 100/4, 43

[56] References Cited

U.S. PATENT DOCUMENTS

| | | | |
|---|---|---|---|
| 4,321,103 | 3/1982 | Lindstrom et al. | 156/360 X |
| 4,507,739 | 3/1985 | Haruki | 209/900 X |
| 4,627,540 | 12/1986 | Takeda | 100/4 X |
| 4,629,528 | 12/1986 | Tanaka et al. | 156/355 X |

*Primary Examiner*—David Simmons

*Attorney, Agent, or Firm*—McGlew and Tuttle

[57] ABSTRACT

An address label preparation processing system for printed matter dispatching, having counter/stackers for preparing printed matter bundles upon receipt of the data on the number of copies per bundle from an address label processing devices, having an address label printing function, for printing on-line address labels for the bundles prepared, and attaching the printed address labels on the bundles as the bundles prepared by the counter/stacker and transported by a conveyor arrive at the system, and characterized in that each of the address label processing devices incorporates therein type fonts and a character enlarging function and has such a construction that address labels can be printed on the basis of the address printing data transmitted from a host computer; the host computer performing control so that the address printing data and the data on the number of copies are allocated sequentially among each of the address label processing devices; the counter/-stacker receiving the number of copies per bundle and the serial number of bundles and transferring bundles to the conveyor; and the address label processing devices correlating the address labels printed and prepared with the bundles for dispatching.

19 Claims, 27 Drawing Sheets

FIG. 39

| | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| 0 | 1 | 1 | 1 | 0 | 0 | 0 | 1 | 1 | 1 | 0 | 0 | 0 | 1 | 1 | 1 | 0 | 0 | 0 | 0 | 0 | 0 | 1 | 1 | 1 | 1 | 1 | 1 | 0 | 0 | 0 | 0 | 0 |
| 1 | 1 | 1 | 1 | 0 | 0 | 0 | 1 | 1 | 1 | 0 | 0 | 0 | 1 | 1 | 1 | 1 | 1 | 1 | 0 | 0 | 0 | 0 | 0 | 0 | 1 | 1 | 1 | 0 | 0 | 0 | 0 | 0 |
| 2 | 1 | 1 | 1 | 0 | 0 | 0 | 1 | 1 | 1 | 0 | 0 | 0 | 0 | 0 | 0 | 1 | 1 | 1 | 0 | 0 | 0 | 1 | 1 | 1 | 1 | 1 | 1 | 0 | 0 | 0 | 0 | 0 |
| 3 | 1 | 1 | 1 | 1 | 1 | 1 | 0 | 0 | 0 | 0 | 0 | 0 | 1 | 1 | 1 | 0 | 0 | 0 | 1 | 1 | 1 | 0 | 0 | 0 | 1 | 1 | 1 | 0 | 0 | 0 | 0 | 0 |
| 4 | 1 | 1 | 1 | 0 | 0 | 0 | 1 | 1 | 1 | 1 | 1 | 1 | 0 | 0 | 0 | 1 | 1 | 1 | 0 | 0 | 0 | 0 | 0 | 0 | 1 | 1 | 1 | 0 | 0 | 0 | 0 | 0 |
| 5 | 1 | 1 | 1 | 1 | 1 | 1 | 0 | 0 | 0 | 1 | 1 | 1 | 0 | 0 | 0 | 1 | 1 | 1 | 0 | 0 | 0 | 0 | 0 | 0 | 1 | 1 | 1 | 0 | 0 | 0 | 0 | 0 |
| 6 | 1 | 1 | 1 | 0 | 0 | 0 | 0 | 0 | 0 | 1 | 1 | 1 | 0 | 0 | 0 | 1 | 1 | 1 | 0 | 0 | 0 | 1 | 1 | 1 | 1 | 1 | 1 | 0 | 0 | 0 | 0 | 0 |
| 7 | 1 | 1 | 1 | 0 | 0 | 0 | 0 | 0 | 0 | 1 | 1 | 1 | 0 | 0 | 0 | 1 | 1 | 1 | 1 | 1 | 1 | 0 | 0 | 0 | 1 | 1 | 1 | 0 | 0 | 0 | 0 | 0 |
| 8 | 1 | 1 | 1 | 0 | 0 | 0 | 0 | 0 | 0 | 1 | 1 | 1 | 1 | 1 | 1 | 0 | 0 | 0 | 1 | 1 | 1 | 0 | 0 | 0 | 1 | 1 | 1 | 0 | 0 | 0 | 0 | 0 |
| 9 | 1 | 1 | 1 | 1 | 1 | 1 | 0 | 0 | 0 | 1 | 1 | 1 | 0 | 0 | 0 | 0 | 0 | 0 | 1 | 1 | 1 | 0 | 0 | 0 | 1 | 1 | 1 | 0 | 0 | 0 | 0 | 0 |
| START & STOP | 1 | 1 | 1 | 0 | 0 | 0 | 1 | 1 | 1 | 1 | 1 | 1 | 0 | 0 | 0 | 0 | | | | | | | | | | | | | | | | |

ADDRESS LABEL PREPARATION PROCESSING SYSTEM FOR PRINTED MATTER DISPATCHING OPERATION

BACKGROUND OF THE INVENTION

1. Field of the Invention

This invention relates generally to an address label preparation processing system for printed matter dispatching operation, and more particularly to an address label preparation processing system for printed matter dispatching operation which sequentially controls the preparation of bundles of printed matter, such as newspaper, and the preparation of address labels, and combines the address labels with the bundles for sorting and delivery.

2. Description of the Prior Art:

In this type of printed matter sorting and delivery job, the following systems have heretofore been employed to perform control functions to correlate the bundles of printed matter with address labels for dispatching.

(i) A system in which address labels are printed and arranged in advance in the sequence of bundle delivery and set into the address label processing device, which reads the data on the number of copies per bundle coded on each address label in the form of bar codes or numerals and transmits the data to the counter/stacker; or reads the dealer code on the address label and transmits the data on the number of copies per bundle to the counter/stacker from the computer, so that the counter/stacker is caused to prepare bundles according to the given data and attach the prepared address labels onto the bundles prepared and transported by the counter/stacker.

(ii) A system in which the data on the number of copies per bundle are given, under the control of a computer, to the counter/stacker in accordance with the sequence of delivery to cause the counter/stacker to prepare bundles, and as the bundles are transferred from the counter/stacker to the stack conveyor, the names of dealers and the number of copies per bundle are displayed for the operator to check the address labels by comparing the contents of the labels with the information displayed and manually attach the labels on the bundles.

Furthermore, when printing printed matter of the same name (type) on a plurality of press units, the number of copies being printed has heretofore been equally allocated among the press units. With such an arrangement, however, it is extremely difficult to adjust the system to cause all the press units to complete the printing process at almost the same time because of the effects of printing speed, web breakage, spoilage, etc., or owing to breakdown of press units or mail-room equipment. Aside from these problems, since various editions of newspaper, for example, are printed in the same time zone, the operation schedule of newspaper transportation trucks has to be finely and systematically worked out to transport such various editions to different destinations. This requires the off-the-press time to be strictly controlled in accordance with various truck transportation courses for each edition. To this end, the operator has to carefully monitor the time of completion of printing at all times. In the event of a problem, it is necessary to easily and flexibly cope with the problem inputting a change in the allocated number of copies being printed to the press units and move address labels to other units (particularly in the failure of the counter/-stacker or the address label tagging device).

SUMMARY OF THE INVENTION

It is an object of this invention to provide an address label preparation processing system for a printed matter dispatching operation that can flexibly cope with the progress of newspaper dispatching operation by successively printing necessary information for address labels on a continuous paper web on the basis of instructions given by the computer, cutting the printing paper web into predetermined lengths to prepare individual address labels.

It is another object of this invention to provide an address label processing device that synchronizes the preparation of the address labels with the preparation of printed matter bundles on which the address labels are attached, and automatically attaches the address labels on the bundles.

It is a further object of this invention to provide an address processing device that is capable of preparing address labels off-line.

It is still a further object of this invention to provide an address lable processing device that is capable of selecting a specific address label from the bundles of address labels prepared off-line and automatically attaching the selected label on a specific printed matter bundle.

BRIEF DESCRIPTION OF THE DRAWINGS

FIG. 39 shows the format of a sub bit patter embodying this invention.

DETAILED DESCRIPTION OF THE DRAWINGS

(I) General Construction

Figure 1:
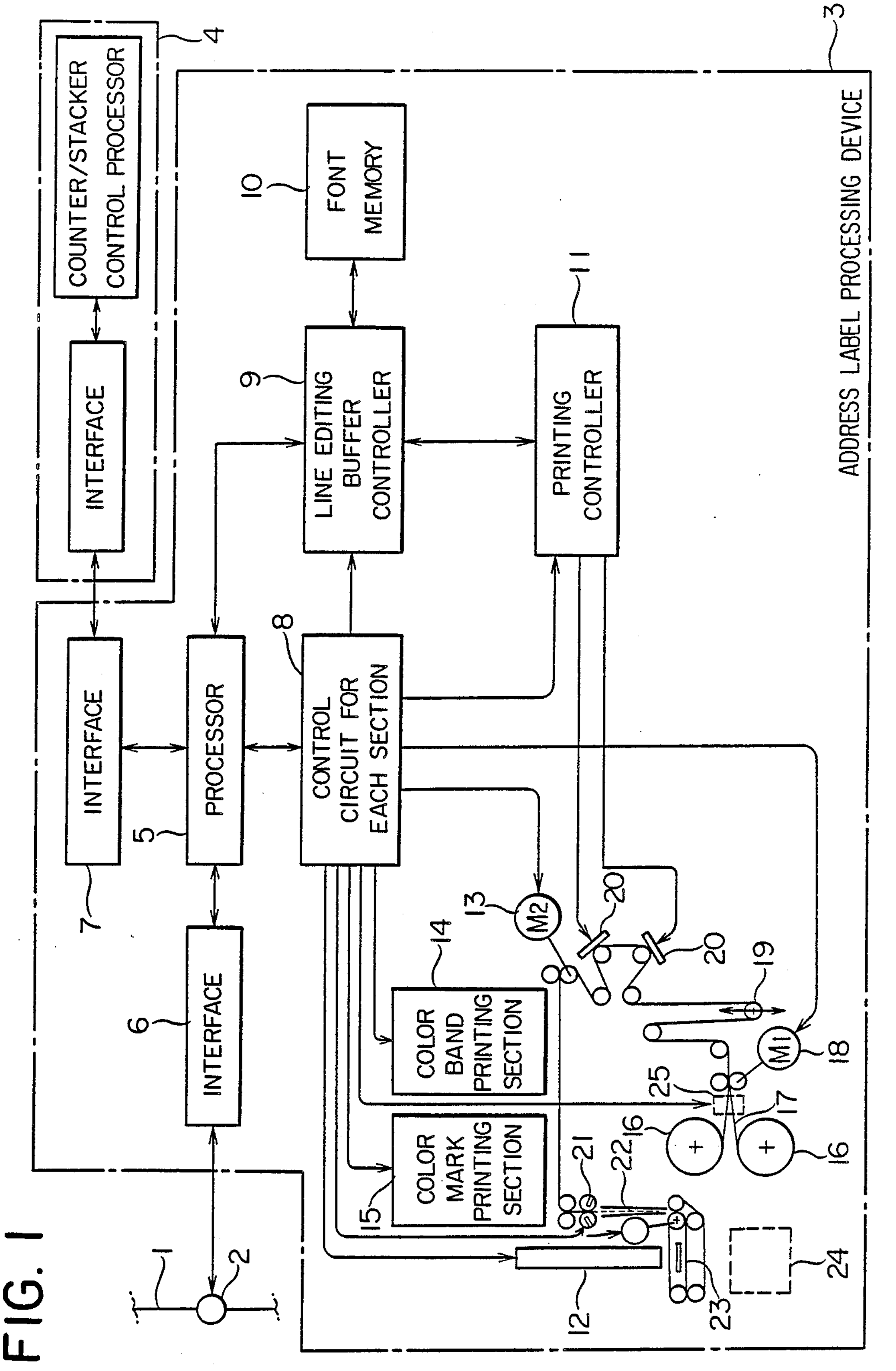
FIG. 1 is a block diagram of a typical system to which this invention is applied.

FIG. 1 is a block diagram of a typical system to which this invention is applied.

Figure 2:
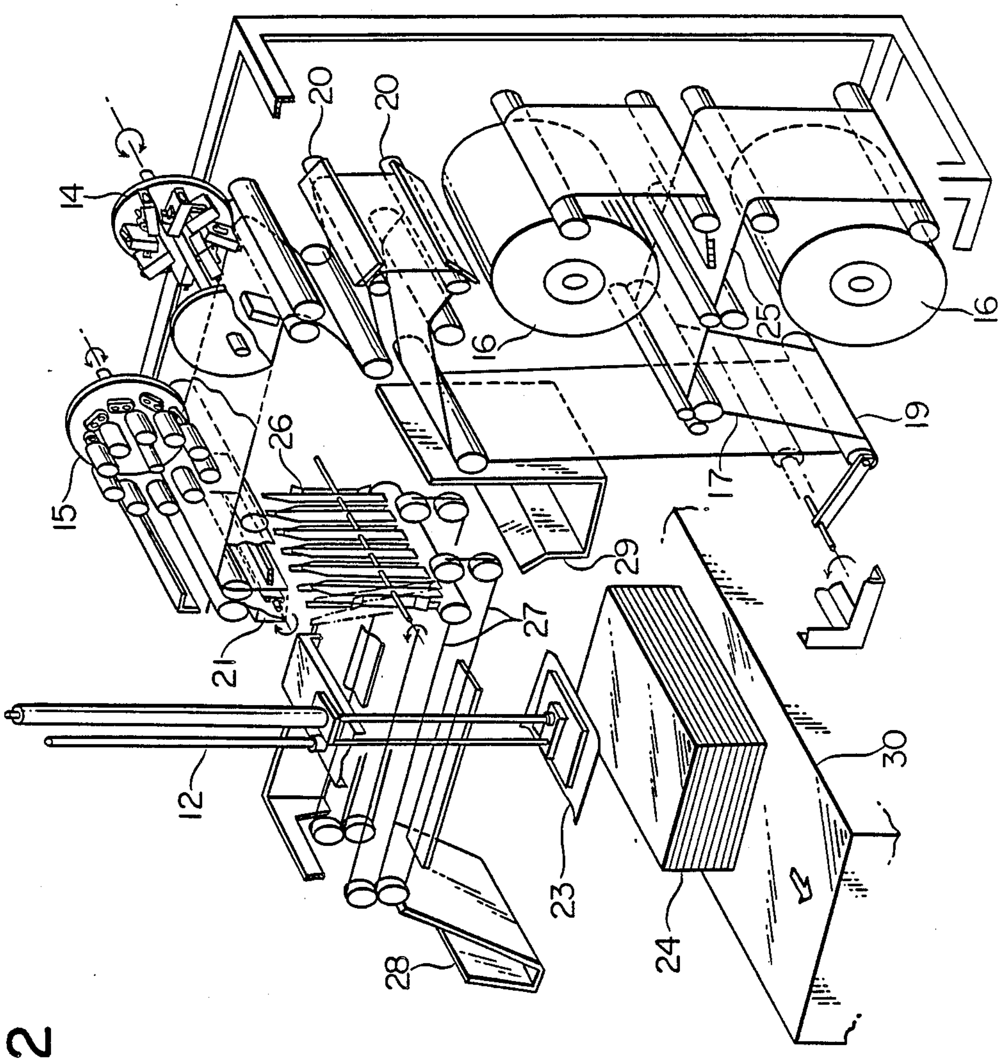
FIG. 2 shows a mechanical construction of essential parts of the address processing device shown in FIG. 1.

In the figure, reference numeral 1 refers to a communication control bus, which is a ring-shaped highway communication control bus provided in such a fashion as to connect various sections and device installations within the printing/dispatching department supervising the entire newspaper printing and dispatching control; 2 to an intelligent station, which is a communication control station, provided on the communication control bus, corresponding to the address label processing device according to this invention; 3 to an address label processing device; 4 to a counter/stacker; 6 to an interface connected to a processor 5 (not shown), which includes a memory; 7 to an interface with the counter/stacker 4; 8 to a control circuit for controlling each section of the address processing device 3; 9 to a line editing buffer controller for editing the data on address label printing; 10 to a front memory; 11 to a printing controller for transferring the edited printing data to a printing head 20; 12 to an air cylinder for tagging an address label on a printed matter bundle; 13 to a pulse motor for feeding a paper web for address labels; 14 to a color band printing section; 15 to a color mark printing section; 16 to a paper roll; 17 to a paper web; 18 to a drive motor for feeding paper from a paper roll; 19 to a dancer roller; 20 to a printing head; 21 to a rotary cutter for cutting printed address lables; 22 to a motor for feeding cut address labels to the tagging position; 23 to an address label now being fed; and 24 to a bundle of printed matter, respectively. The address printing data transmitted from a host computer (not shown) are stored in the memory of the processor 5 via the communication control bus 1 and the intelligent station 2, and written in the line editing buffer for address label printing under program control. The line editing buffer controller 9 makes access to the font memory 10 on the basis of printing data (character codes, magnification factors for enlarging characters, printing positions, etc.), and writes character data per line in the line editing buffer, in the form of image data, on the basis of the data on printing positions and character magnification factors. Since the printing head 20 consists of a plurality of heads, character data necessary for each head are edited. The edited data are transferred to the printing controller 11, and further to the printing head 20. The timing of printing is determined by an instruction signal from the control circuit 8 which takes charge of driving the printing unit. Since various data on bundles (hereinafter referred to as bundle data) are received as address printing data in the memory of the processor 5, the bundle data is sent to the counter/stacker 4 via the interface 7. The timing of these control operations is controlled by the processor 5. The address label processing device 3 is equipped with the paster 25 so that address labels can be continuously printed. The information on sorting bar code printing, color mark printing and color band printing is included in the address printing data and printed. FIG. 2 shows the mechanical construction of essential parts of the address label processing device shown in FIG. 1. In the figure, reference numerals 12, 14, 15, 16, 17, 19, 20, 21, 23, 24 and 25 correspond with like parts in FIG. 1. Numeral 26 refers to an address label relaying section; 27 to an address label feeding section; 28 and 29 to address label recovery sections; and 30 to a conveyor, respectively.

A paper web 17 for preparing address labels is supplied by a paper roll 16 shown in the lower part of the figure. The paper web 17 is fed to a plurality of the printing heads 20 and 20, on which the information necessary for individual address labels is printed. Color bands are printed on the paper web 17 in the color band printing section 14 while color marks are printed thereon in the color mark printing section 15. The paper web 17 is cut by the cutter 21 into individual sheets of address labels 23. The cut address labels 23 are received one after another by the address label relaying section 26 and sent to the address label feeding section 27. In the address label feeding section 27, the address label 23 is placed in the horizontal position by the belt, as will be described later, and pushed downward by the air cylinder 12 to the lower part of the figure. At this time, the newspaper bundle 24 to which the address label 23 is to be attached is moved along on the conveyor 30, and the address label 23 pushed downward by the air cylinder 12 is attached on the bundle 24, as has been described, referring to FIG. 1.

The address label 23 is prepared in synchronism with the preparation of the bundle 24, as described above, and automatically attached on the bundle 24. It is desired, however, that arrangement should be made to prepare the address label 23 in advance off-line as necessary. To this end, the address recovery sections 28 and 29 are provided in FIG. 2.

In this case, the address labels which are printed and cut into sheets beforehand, as described above, are fed on the address label feeding section 27 by the belt, and stacked on the address label recovery section 28 as the operation of the air cylinder 12 is discontinued. In some cases, the address labels 23 are recovered directly from the address label relaying section 26 onto the address label recovery section 29.

As described above, the address labels recovered on the address label recovery section 28 or 29 are stacked in a predetermined order, as will be described later with reference to FIG. 26, and attached on the newspaper bundles 24 prepared by the counter/stacker.

(II) Essential Parts Relating to Address Label Preparation

Figure 4:
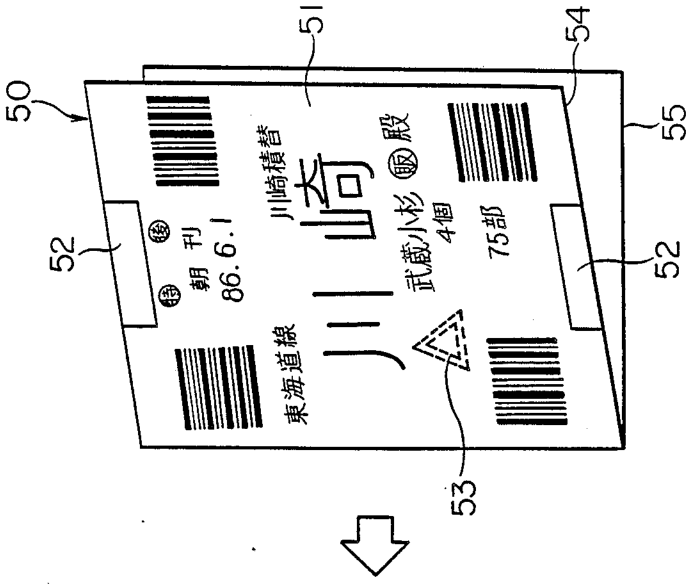
FIG. 4 shows an example of an address label for combined transportation.
Figure 3A:
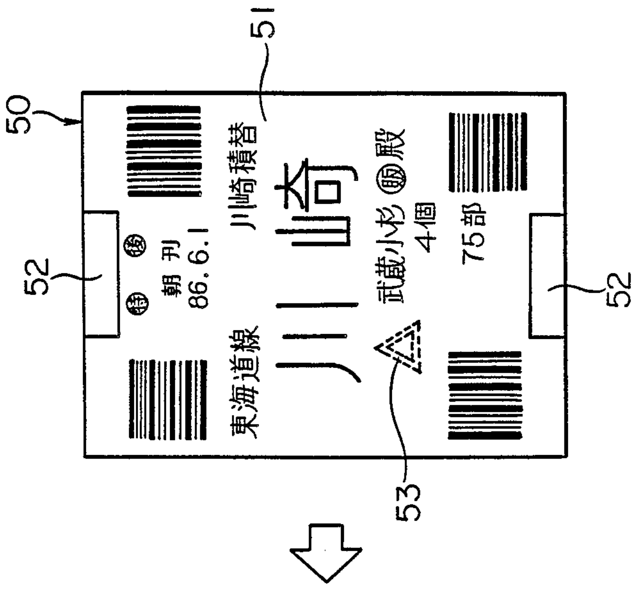
FIGS. 3A and 3B show examples of address labels that can be obtained by this invention.
Figure 3B:
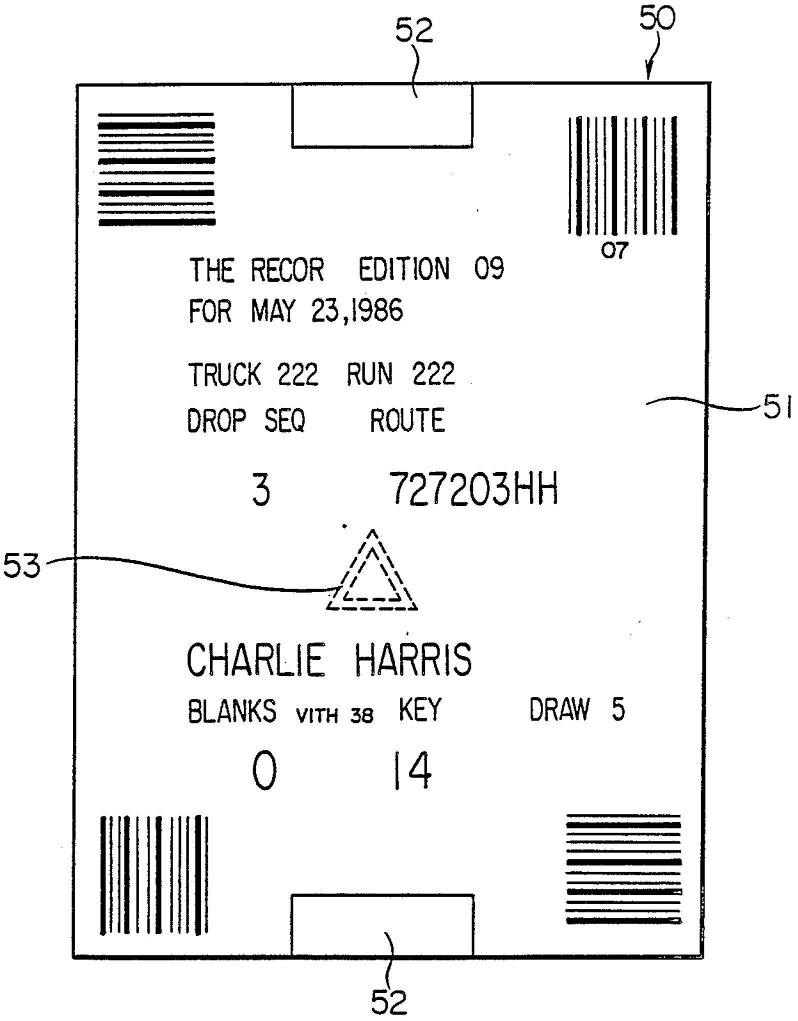
Figure 5:
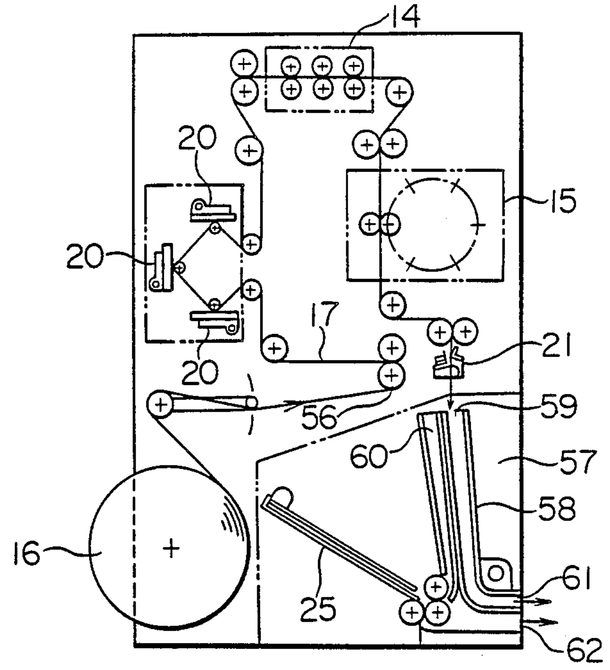
FIG. 5 shows the construction corresponding to FIG. 2.
Figure 6:
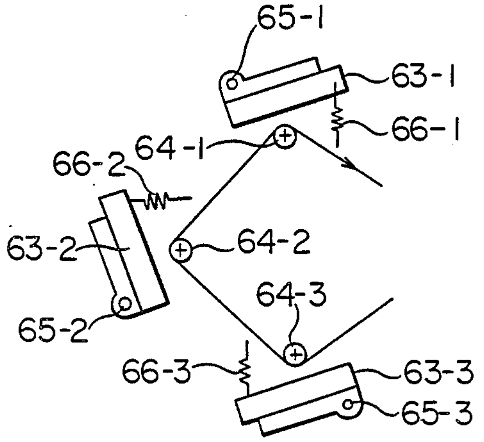
FIG. 6 is a diagram of assistance in explaining the printing section using the printing heads shown in FIG. 5.
Figure 7:
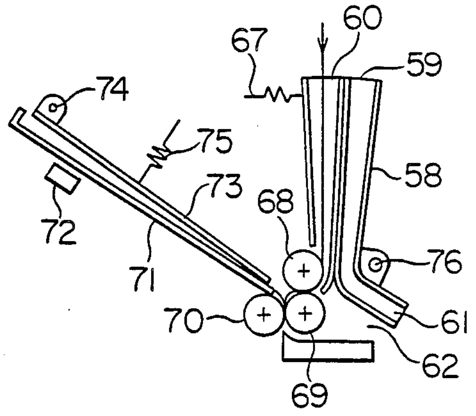
FIG. 7 is a diagram of assistance in explaining the sorting section that sorts ordinary address labels from special address labels for combined transportation, and the folding section, as shown in FIG. 5.

FIGS. 3A and 3B show examples of ordinary address labels obtained by this invention, FIG. 4 shows an example of address label for combined transportation, FIG. 5 shows the construction corresponding to FIG. 2, FIG. 6 is a diagram of assistance in explaining a printing section by means of printing heads, FIG. 7 is a diagram of assistance in explaining the sorting section for sorting ordinary address labels from address labels for combined transportation and the folding section, shown in FIG. 5, respectively.

In FIGS. 3A and 3B, numeral 50 refers to an address label; 51 to a heat transfer printing area; 52 to a color band printing area; 53 to a color mark printing area, and the address label is constructed of a sheet of paper having no folded part.

FIG. 4 shows an address label for combined transportation having a twice-folded part. In the figure, numeral 54 indicates one half-leaf with the information on combined-transportation address label printed; 55 indicates the other half-leaf on which no information on combined-transportation address label is printed, and other numerals correspond with like numerals in FIG. 3.

In FIG. 5, numeral 16 refers to a heat-sensitive recording paper roll; 56 to a paper feeding roller; 17 to a heat-sensitive recording paper web; 20 to a heat transfer printing section by means of a plurality of thermal heads; 14 to a color band printing section; 15 to a color mark printing section; 21 to a cutter; 57 to a sorting-/folding section; 58 to a sorting guide; 59 to an ordinary address label entry; 60 to an entry for combined-transportation address labels; 61 to an ordinary address label exit; 62 to an exit for combined-transportation address labels, respectively.

The heat-sensitive recording paper web 17 is fed from the heat-sensitive recording paper roll 16 by means of the paper feeding roller under the control of a computer (not shown). The heat-sensitive recording paper web 17 is further fed to the heat transfer printing section 20 having a plurality of thermal heads, in which the heat transfer printing area 51 on the ordinary address label 50 or on one half-leaf of the combined-transportation address label 54 shown in FIGS. 3 and 4 are heat transfer printed by the thermal heads on the basis of an image signal fed from the computer, and the color band printing area 52 shown in FIG. 5 is also color-printed. Then, the heat-sensitive recording paper web 17 is fed to the color mark printing section 15, in which the color mark printing area 53 shown in FIG. 4 is color-printed. In this way, the heat-sensitive recording paper web 17 on each printing area on which necessary information has been printed is cut into ordinary address labels or combined-transportation address labels by the cutter 21 that is operated on the basis of the information fed by the computer. The ordinary address labels or the combined-transportation address labels are sorted by the sorting guide 58 of the sorting/folding section 57 also operating on the basis of the information from the computer, as in the case described above. That is, the ordinary address labels are received by the ordinary address label entry 59 and discharged from the ordinary address label exit 61. The combined-transportation address labels are, on the other hand, received by the combined-transportation address label entry 60 of the sorting guide 58 and discharged in the twice-folded state from the combined-transportation address label exit 62. In such a fashion as described above, the ordinary address labels or the combined-transportation address labels are continuously prepared one after another.

FIG. 6 is a diagram of assistance in explaining the heat transfer printing section using thermal heads shown in FIG. 5. In the figure, numerals 63-1, 63-2 and 63-3 refer to thermal heads; 64-1 64-2 and 64-3 to platens; 65-1, 65-2 and 65-3 to fulcrums for rotating the thermal heads; 66-1, 66-2 and 66-3 to springs, respectively.

Heat transfer printing by means of the thermal heads according to this invention is carried out in such a manner that a plurality of thermal heads simultaneously heat each part of a heat-sensitive recording paper which is assigned to each of the thermal heads to print the heat transfer printing area 51 shown in FIGS. 3 and 4. That is, in printing the heat transfer print area 51, the area is equally divided, and the printing of each divided part is assigned to each of the thermal heads. Consequently, the number of thermal heads corresponds with the number of divisions of the heat transfer print area 51. An image signal is given to each of the thermal heads by the computer. In the embodiment shown in FIG. 6, three thermal heads 63-1, 63-2 and 63-3 are provided. The figure shows the state in which upon completion of heat transfer printing, the three thermal heads are caused to rotate around the fulcrum 65 to retreat away from the heat-sensitive recording paper. That is, the magnet (not shown) is actuated by an information given by the computer to cause the thermal heads 63-1, 63-2 and 63-3 to rotate around the respective fulcrums thereof 65-1, 65-2 and 65-3, resisting against the force of the springs 66-1, 66-2 and 66-3, to move away from the platens 64-1, 64-2 and 64-3. After that, the heat-sensitive recording paper is fast-forwarded by a predetermined length. Thus, the magnet is released, and the three thermal head 63-1, 63-2 and 63-3 are caused to rotate around the fulcrums 65-1, 65-2 and 65-3 by the force of the springs 66-1, 66-2 and 66-3 to return to the respective original positions thereof, coming in contact with the heat transfer recording paper at the platens 64-1, 64-2 and 64-3 to start the next printing. While printing is carried out by the thermal heads, it may be considered that color band printing and color mark printing are also performed by the aforementioned color band printing section 14 and by the color mark printing section 15, respectively.

FIG. 7 is a diagram of assistance in explaining the sorting section for sorting ordinary address labels from combined-transportation address labels, and the folding section for folding combined-transportation address labels, both shown in FIG. 5. In the figure, numerals 58 through 62 correspond with like parts in FIG. 5. 67 and 75 refer to springs; 68 to a holding roller; 69 to a drive roller; 70 to a nipping roller; 71 to a folding guide; 72 to a sensor; 73 to a nipper; and 74 and 76 to fulcrums, respectively.

The sorting guide 58 shown in FIG. 7 is caused to rotate around the fulcrum 76 so that the combined-transportation address label cut by the cutter 21 shown in FIG. 5 is received by the combined-transportation address label entry 60 at the sorting guide 58. The combined-transportation address label received by the combined-transportation address label entry 60 is passed through the sorting guide 58 and fed to the folding guide 71 by the holding roller 68 and the drive roller 69. As the sensor 72 detects the arrival of the combined-transportation address label at the folding guide 71, the magnet (not shown) is actuated to cause the tip of the nipper 73 to rotate around the fulcrum 74 and to be forced onto the side of the folding guide 71. As a result, the combined-transportation address label fed to the folding guide 71 is held between the folding guide 71 and the tip of the nipper 73. Notwithstanding the fact that the combined-transportation address label is prevented from further progressing into the folding guide 71 in this manner, the holding roller 68 and the drive roller 69 still continue to feed the residual part of the combined-transportation address label, that is, the part of the combined-transportation address label that has not yet arrived at the folding guide 71. As a result, the residual part of the combined-transportation address label forms a loop in front of the folding guide 71. The loop formed by the combined-transportation address label is gripped and drawn by the nipping roller 70 and the drive roller 69. Thus, the part of the label that has been fed to the folding guide 71 and the part thereof that has not yet arrived at the folding guide 71 are overlapped and doubled, and then the doubled combined-transportation address label is discharged from the combined-transportation address label exit 62. As the sensor 72 detects the discharge of the combined-transportation address label from the folding guide 71, the magnet is released to cause the nipper 73 to return, by the force of the spring 75, to the original position to prepare for the introduction of the next combined-transportation address label.

As described above, this invention makes it possible to overcome the problem of printing capacity with the conventional type of heat transfer printing method using thermal heads, and to substantially extend the service life of the thermal head by causing the thermal head to move away from the paper web surface during the feeding of paper web, thereby reducing the wear of the thermal head. Provision of the doubling mechanism, moreover, makes it possible to manufacture all kinds of address labels at high speed.

Figure 8:
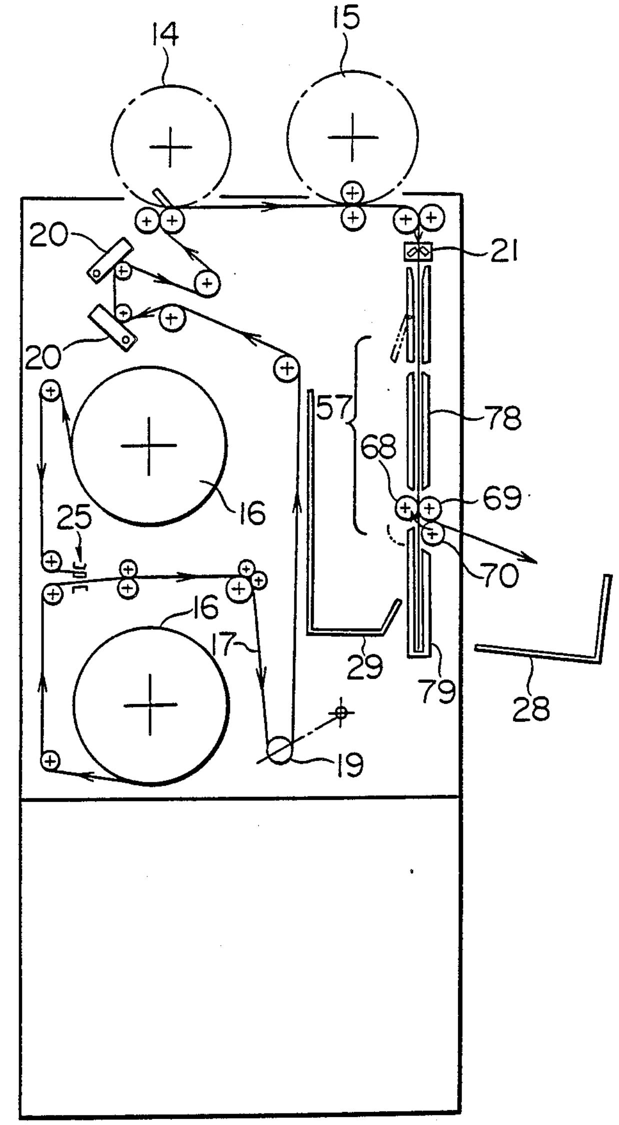
FIG. 8 is a schematic diagram outlining the construction shown in FIG. 2.
Figure 9:
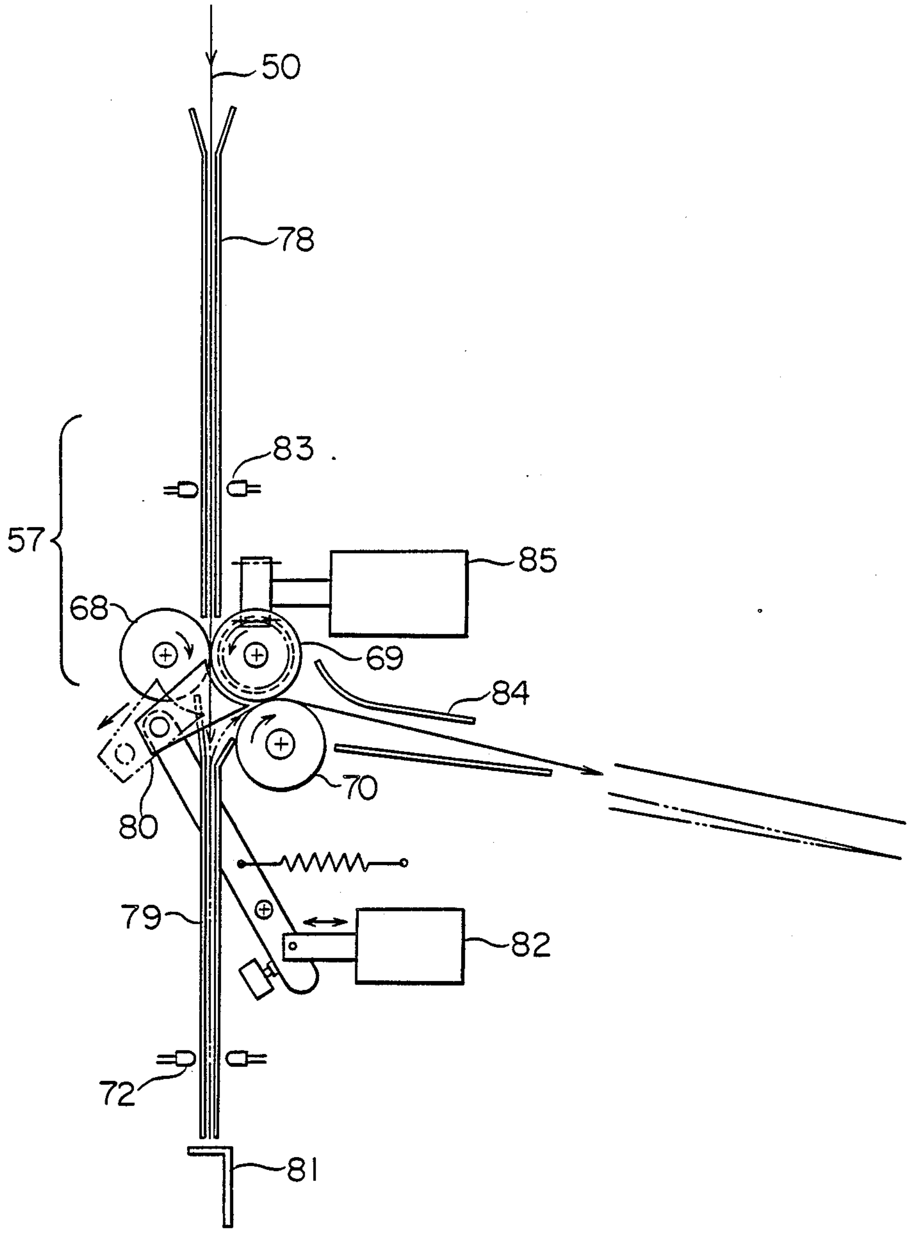
FIG. 9 is a detailed diagram illustrating the sorting section and the folding section shown in FIG. 8.

It should be noted that there is some difference in details between the construction shown in FIG. 5 and the construction shown in FIG. 2. The difference lies in the number of heat transfer printing sections 20, the constructions of the color band printing section 14 and the color mark printing section 15, and the construction of the sorting/folding section 57. FIG. 8 is a schematic representation of the construction shown in FIG. 2, representing a variation of the construction shown in FIG. 5. In the figure, like numerals correspond with like parts in FIGS. 2, 5 and 7. FIG. 9 shows the details of the sorting/folding section 57 shown in FIG. 8.

In the embodiment shown in FIGS. 8 and 9, the address label guide 78 having a single entry is provided, and the folding guide 79 corresponding to the folding guide 25 shown in FIG. 7 is disposed vertically in alignment with the address label guide 78.

When an ordinary address label 50 shown in FIG. 3 is fed, the magnet 82 is in the deenergized state, bringing the hammer 80 into a position shown by solid lines in FIG. 9. As the ordinary address label 50 is fed while being held by the rollers 68 and 69, therefore, the tip of the address label 50 is diverted by the hammer 80 toward the roller 70 side, and discharged to the guide 84. As the sensor 83 detects the tail of the address label 50, the next address label 50 is fed. The embodiment shown in FIG. 2 is constructed so that the discharged address label is automatically placed on the printed matter bundle 24.

In the case of the combined-transportation address label 50 shown in FIG. 4, instead of the ordinary address label shown in FIG. 4, the sorting/folding section 57 operates in the following manner. In this case, the magnet 82 is in the energized state, attracting the hammer 80 into a position shown by chain lines in FIG. 9. In this state, when the combined-transportation address label 50 is fed while being held by the rollers 68 and 69, the tip of the label 50 proceeds toward the folding guide 79, reaching the stopper 81. The sensor 72 detects the label 50 as the label passes by the sensor 72. At this timing, the magnet 82 is brought into the deenergized state, returning the hammer 80 to the position shown by solid lines in the figure, forcing the central part of the combined-transportation address label 50, which lies halfway between the guide 78 and 79, toward the roller 70 side. As a result, the combined-transportation label 50 is folded at the center thereof, and discharged to the guide 84 while being held by the rollers 69 and 70 in the shape shown in FIG. 4. Note that the roller 69 is driven by the drive motor 85.

(III) Essential Parts Relating to Color Band Printing

Figure 10:
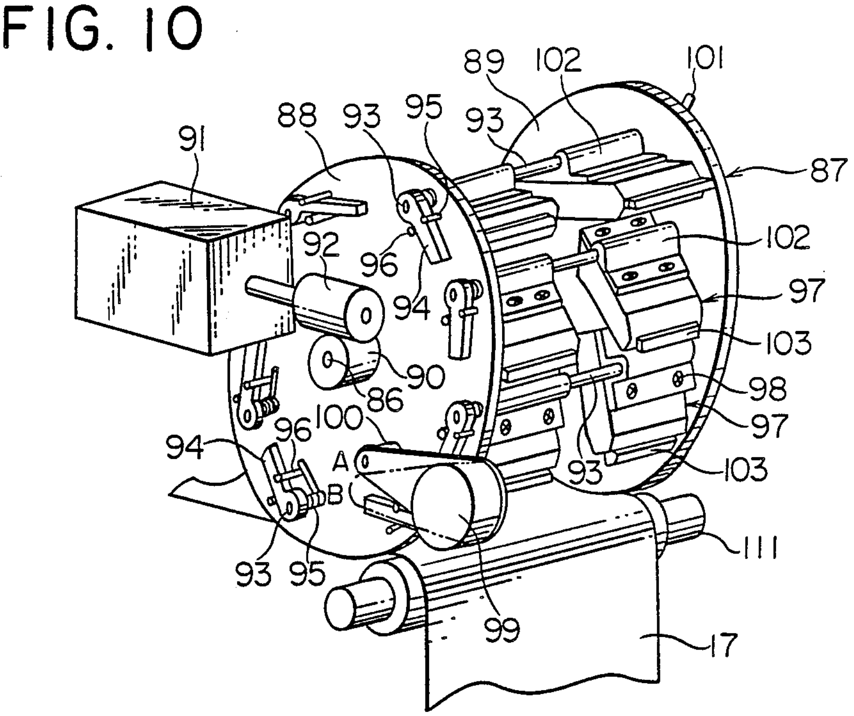
FIG. 10 shows the construction of a color band printing section.
Figure 11:
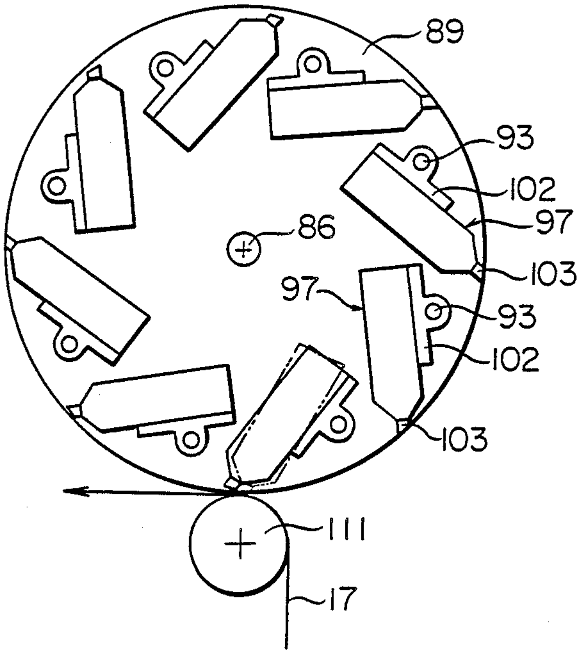
FIG. 11 is a longitudinal section of a turret assembly.

The color band printing section 14 shown in FIGS. 2, 5 or 8 is used for printing any desired color in a strip shape on the color band print area 52 of the address label 50 shown in FIGS. 3 or 4. FIG. 10 shows the construction of the color band printing section 14. FIG. 11 is a longitudinal section of a turret assembly. Although the embodiment shown in FIG. 5 has not any turret mechanism, there is essentially no difference in the function of color band printing.

In FIGS. 10 and 11, turret plates 88 and 89 comprising a turret assembly 87 are fixedly fitted to a rotating shaft 86, and a worm wheel 90 is fixedly fitted to the rotating shaft 86 protruding from the turret plate 88 toward the outside surface. The worm wheel 90 is in mesh with a worm 92 fixedly fitted to the shaft of a motor 91. The motor 91, which can be a servo motor or a pulse motor or the like, is capable of controlling the rotation of the turret assembly 87 to set the assembly 87 at a desired angular position via the worm 92 and the worm wheel 90. A plurality of fixed shafts 93 are rotatably supported between the turret plates 88 and 89 on the same circumference at equal spacings. One end of the fixed shaft 93 is protruded toward the outside surface of the turret plate 88, and a lever 94 is fixedly fitted to the tip of the protruded shaft 93. A spring 95 is provided on the fixed shaft 93 between the lever 94 and the turret plate 88. The lever 94 is preloaded to rotate by the spring 95 engaging therewith, but is stopped by a stopper 96 provided on the turret plate 88. Holders 102 for mounted color band printing elements are each fitted in parallel with each other onto each of the fixed shafts 93 rotatably supported between the turret plates 88 and 89. A color band printing element cartridge 97 is mounted by bolts 98 on the holder 102. Consequently, when the lever 94 is caused to rotate against the resiliency of the spring 95, the cartridge 97 follows the rocking motion of the lever 94. This rocking motion is produced by a rotary solenoid 99 mounted on a mounting plate (not shown). At the tip of the rotary solenoid 99, rotatably provided is a bearing 100, which when the rotary solenoid 99 is energized, becomes engaged with the tip of the lever 94, pushing the lever 94 against the resiliency of the spring 95 to cause the fixed shaft 93 to rotate. When the rotary solenoid 99 is de-energized, the lever 94 is returned, by the aid of the resiliency of the spring 95, to the original position, that is, a position at which the lever 94 is stopped by the stopper 96, whereby the fixed shaft 93 is also returned to the original position. Thus, the cartridge 97 rocks around the fixed shaft 93 which fixedly fits the cartridge 97.

On the outside surface of the turret plate 89 provided is a reset sensor marker 101 for sensing the rotating direction of the turret assembly 87. Numeral 17 refers to a paper web; 111 to a platen, respectively.

Figure 12:
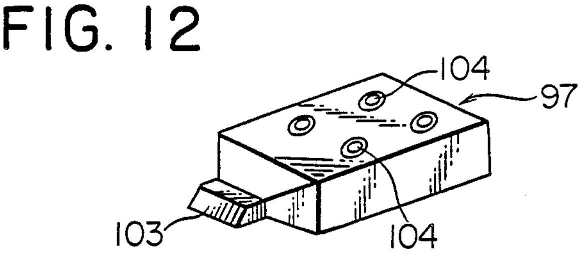
FIG. 12 shows the construction of a color band printing element cartridge.

On the color band printing element cartridge 97 provided are threaded holes 104 (as shown in FIG. 12) so as to allow the cartridge 97 to be interchabgeably mounted on the holder 102. At the tip of the cartridge 97 provided is a felt tip 103 which is impregnated with ink of a color being printed. The felt tip 103 comes in contact with the paper web 17 as the cartridge 97 rotates, the color band print area 52 having diagonal lines on the address label 50 is printed. In order to effect printing of a desired color, the color band printing section 14 has such a construction that the holder 102 can set and fixedly fitted at any position on the fixed shaft 93.

Now, the operation of the color band printing section 14 will be described in the following.

A signal for printing a desired color band on the color band printing area 52 of the address label 50 is input to a control circuit (not shown). The reset sensor marker 101 provided on the outside surface of the turret plate 89 is detected by a sensor (not shown), which in turn feeds a sensor signal to the control circuit. When the signal is received by the control circuit, the motor 91 causes the turret assembly 87 to rotate in the direction that needs the smallest amount of rotation via the worm 92 and the worm wheel 90, bringing the lever 94 of the fixed shaft 93, to which the cartridge 97 having the felt tip 103 impregnated with a desired color ink is fitted, to a position immediately beneath the bearing 100 of the rotary solenoid 99. Next, a signal for driving the rotary solenoid 99 is generated by the control circuit to energize the rotary solenoid 99. This causes the bearing 100 to move downward and push the lever 94 from the position A to the position B shown in the figure. The fixed shaft 93 is caused to rotate by the pushed lever 94, causing the cartridge 97 having the felt tip 103 impregnated with a desired color ink to rotate, whereby the felt tip 103 comes in contact with the paper web 17. That is, a desired color band is printed on a predetermined position of the paper web 17. When a signal for deenergizing the rotary solenoid 99 is generated by the control circuit, the bearing 100 provided on the rotary solenoid 99 is reset to the original position A. At the same time, the lever 94 is rotated in the direction of the stopper 96, and is caused to stop by the stopper 96. With this, the cartridge 97, which has been kept in contact with the paper web 17 to print a color band, is disengaged from the paper web 17 to complete the color band printing process. Then, the color band printing section 14 is put into a state ready for the next color band printing.

Figure 13:
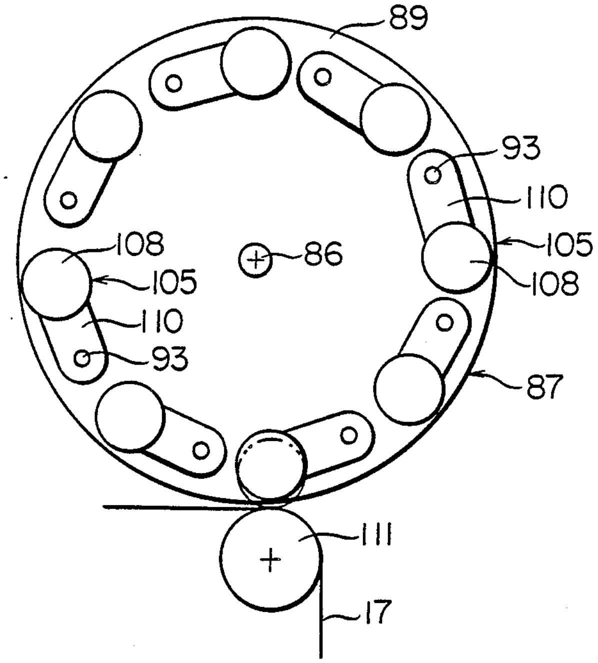
FIG. 13 is a longitudinal section of another embodiment of the turret assembly.
Figure 14:
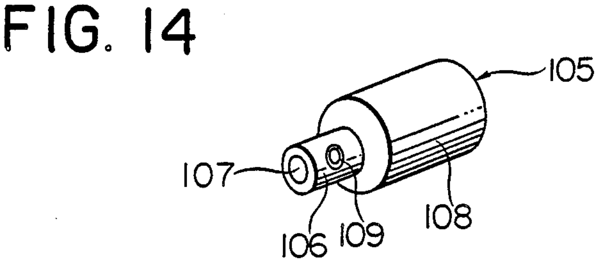
FIG. 14 shows the construction of an ink impregnated roller.

FIG. 13 is a longitudinal section of another embodiment of the turret assembly according to this invention. Numerals 86, 87, 93, 17 and 111 correspond with like parts shown in FIGS. 10 and 11. Numeral 105 refers to an impregnated roller having a construction shown in FIG. 14. That is, a hole 107 for receiving the shaft (not shown) of a holder 110 for fixedly fitting the impregnated roller 105 is provided at the center of a shaft 106, and the outer circumference of the shaft 106 is covered with impregnated rubber 108. A threaded hole 109 is provided on part of the shaft 106, as shown in FIG. 14. The impregnated roller 105 is disposed at a predetermined position, that is, a position at which the impregnated rubber 108 agrees with the color band printing area 52 of the address label 50. The impregnated roller 105 is fixedly fitted to the shaft (not shown) of the holder 110 by means of bolts.

Color band printing by means of the impregnated roller 105 shown in FIG. 13 is exactly the same as with the cartridge 97. That is, a desired color ink injected into the impregnated rubber 108 is printed while the impregnated roller 105 comes in contact with the paper web 17.

The holder 110 for fixedly fitting the impregnated roller 105 is adapted to be set and fixedly fitted at a given position on the fixed shaft 93.

As described above, the color band printing section according to this invention makes it possible to provide any desired number of fixed shafts to be fitted to the turret assembly, and to provide any desired number of color band printing elements at any desired position of the fixed shaft, thereby allowing variations in combinations of color bands and printing positions. Furthermore, the use of only one rotary solenoid unit for driving the fixed shaft makes the entire color band printing section compact in size and facilitates the attaching-/detaching and maintenance of the color band printing element cartridge or the impregnated roller.

(IV) Essential Parts Relating to Color Mark Printing

The color mark printing section 15 shown in FIGS. 2, 5 or 8 is used for printing a desired color as necessary on the color mark print area 53 of the address label 50 shown in FIGS. 3 or 4.

The name of dealer, the number of bundles, the number of copies, the bar code, etc. on the address label 50 are printed by the character printing device. Numeral 53 refers to a color mark having various colors, such as △. The color mark 53 is printed by a color mark roller 112 shown in FIG. 15.

Figure 15:
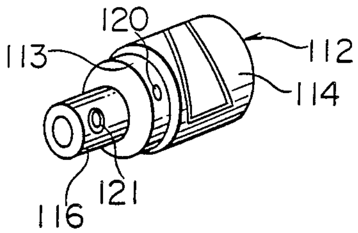
FIG. 15 shows the construction of a color mark roller.
Figure 16:
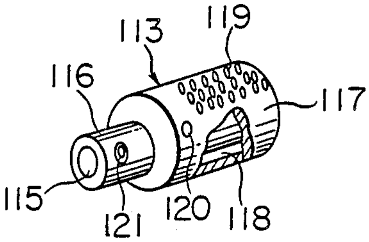
FIG. 16 shows the internal construction of the color mark roller shown in FIG. 15.
Figure 17:
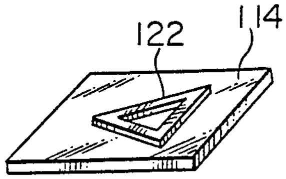
FIG. 17 shows the construction of a color mark printing plate.
Figure 18:
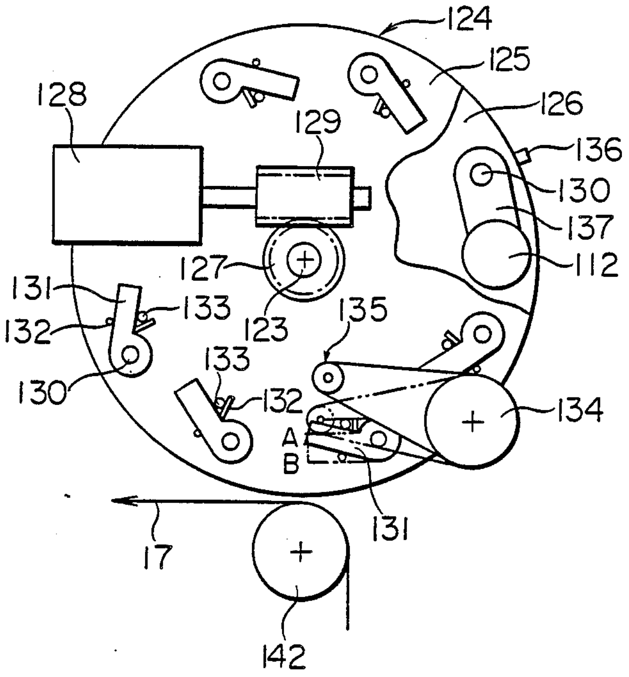
FIG. 18 shows the construction of a color mark printing section.
Figure 19:
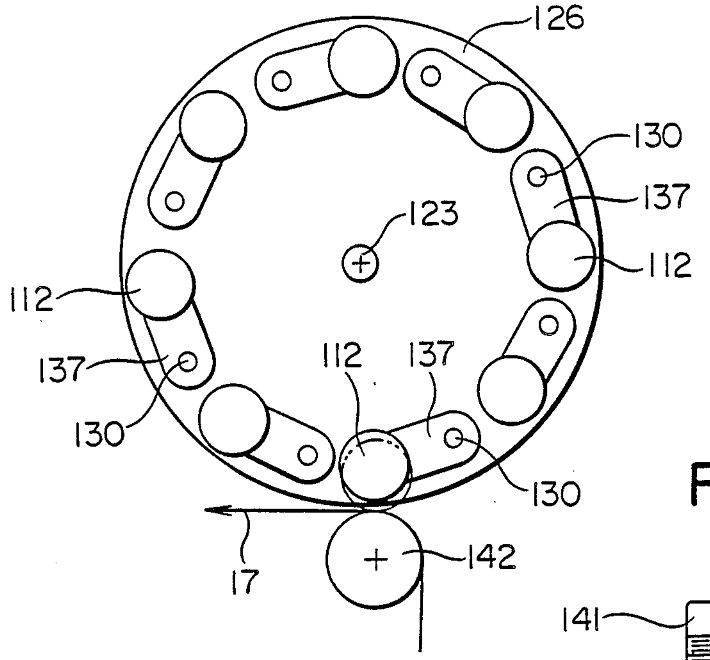
FIG. 19 is a longitudinal section of a turret assembly.

In FIG. 15, the color mark roller 112 consists of a pipe assembly 113, an impregnated rubber 114 applied onto the cylindrical surface of the pipe assembly 113. As shown in FIG. 16, a concentrical tubular member 117 is provided, and a hollow part 118 is formed on the outside surface of a pipe member 116 having a through hole 115. On the surface of the tubular member 117 a multitude of small holes 119 are provided in a checkered or zigzag pattern (the small holes 119 in the figure are exaggerated for clarity) so that the ink injected to the hollow part 118 is released out of the small holes 119 by centrifugal force as the pipe assembly 113 is rotated. On the surface of the tubular member 117, provided is an ink injection hole 120 to inject ink into the hollow part 118. The ink injection hole 120 is plugged after ink has been injected into the hollow part 118. Numeral 121 refers to a threaded hole. The surface of the tubular member 117 is coated with the impregnated rubber 114 shown in FIG. 17. An impression 122 representing a mark being printed is formed in advance on the impregnated rubber 114.

Consequently, as the color mark roller 112 is rotated, the ink stored in the hollow part 118 provided in the pipe assembly 113 is released through the small holes 119 by centrifugal force onto the impregnated rubber 114 and absorbed by the impregnated rubber 114. As the color mark roller 112 is rotated while pressed onto the paper web, the impression 122 of the mark ⚠ is printed on the paper web.

Figure 21:
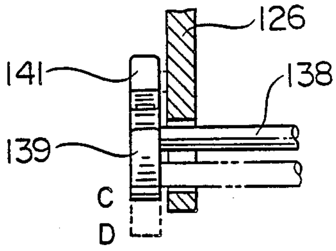
FIG. 21 is a partially enlarged view of the turret assembly of assistance in explaining cam action.
Figure 20:
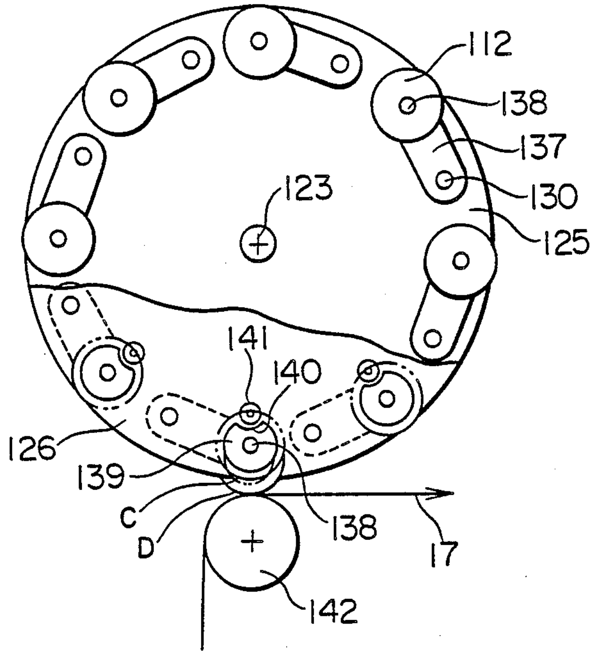
FIG. 20 is a partial side view of the turret assembly of assistance in explaining the action of a positioning cam.

In FIGS. 18 through 21, turret plates 125 and 126 comprising a turret assembly 124 are fixedly fitted to a rotating shaft 123. A worm wheel 127 is fitted to the rotating shaft protruding from the turret plate 125 toward the outside surface. The worm wheel 127 is in mesh with a worm 129 fixedly fitted to the shaft of the motor 128. The motor 128, which can be a servo motor or a pluse motor, is capable of controlling the rotation of the turret assembly 124 at any desired angular position via the worm 129 and the worm wheel 127. A plurality of fixed shafts 130 are rotatably supported between the turret plates 125 and 126 on the same circumference at equal spacings in such a fashion that the fixed shafts 130 protrude from the outside surface of the turret plates 125 and 126. At the tip of the fixed shaft 130 protruding from the outside surface of the turret plate 125 fixedly fitted is a lever 131. A spring 132 is provided on the fixed shaft 130 between the lever 131 and the turret plate 125. The lever is preloaded to rotate by the spring 132 engaged therewith, but is stopped by a stopper 133 provided on the outside surface of the turret plate 125. Holders 137 for mounting the above described color mark roller 112 are each fitted to each of the fixed shafts 130 supported between the turret plates 125 and 126. On the holder 137 rotatably supported is a color mark roller shaft 138 (as shown in FIGS. 20 and 21). The color mark roller 112 having an impression of a desired mark is screwed onto the color mark roller shaft 138. The printing position of the color mark on the address label is determined by the position at which the color mark roller 112 is screwed. As the lever 131 is rotated against the resiliency of the spring 132, the color mark roller 112 follows the rocking motion of the lever 131. This rocking motion is generated by a rotary solenoid 134 mounted on a mounting plate (not shown). At the tip of the rotary solenoid 134 rotatably provided is a bearing 135. When the rotary solenoid 134 is energized, the bearing 135 is engaged with the tip of the rotary solenoid, pushing the lever 131 downward against the resiliency of the spring 132 to cause the fixed shaft 130 to rotate. When the rotary solenoid 134 is deenergized, the lever 131 is returned, by the resiliency of the spring 132, to the original position, that is, the position at which the lever 131 is stopped by the stopper 133, causing the fixed shaft 130 to return to the original position. As a result, the color mark roller 112 rocks around the fixed shaft 130.

The color mark roller shaft 130 to which the color mark roller 112 is protruded from the outside surface of the turret plate 126. Positioning cams 139 having grooves 140 are each fixedly fitted to each of the protruded color mark roller shafts 138. On the outside surface of the turret plate 126 installed is a bearing 141 which is engaged with the groove 140 to stop the rotation of the positioning cam 139.

When the rotary solenoid 134 is energized the lever 131 located immediately beneath the bearing 135 of the rotary solenoid 134 is pushed downward, as described above, causing the positioning cam 139 fixedly fitted to the color mark roller shaft 130 to lower from the position C to the position D shown in the figure. This causes the groove 140 provided on the positioning cam 139 to disengage from the bearing 141, allowing the color mark roller 112 rotating together with the positioning cam 139 to rotate freely. When the rotary solenoid 134 is deenergized, the resiliency of the spring 132 pushes the color mark roller 112 upward to return to the original position, but the contact of the bearing 141 with the other area than the groove 140 of the contour of the positioning cam 139 prevents the color mark roller 112 from returning to the original position. As the color mark roller 112 continues to rotate, however, the bearing 141 follows the contour of the positioning cam 139, and finally engages with the groove 140. This causes the color mark roller 112 to stop rotation and return to the original position. Consequently, the color mark roller 112 can start rotation from a predetermined position at all times. In other words, the starting position of the color mark roller 112 can be controlled by the groove 140 provided on the positioning cam 139.

On the outside surface of the turret plate 126 provided is a reset sensor marker 136 for detecting the direction of rotation of the turret assembly 124. Numeral 17 refers to a paper web; 142 to a platen, respectively.

When the rotary solenoid 134 is energized and the color mark roller 112 is forced onto the paper web 17 on the platen 142, the color mark roller 112 starts rotating to print a colored mark ⚠ on the designated position 53 of the address label 50.

This operation will be described in the following.

A signal for selecting a color mark roller 112 for printing a desired color mark on the color mark print area 53 of the address label 50 on which the mark is to be printed is input to a control circuit (not shown). The reset sensor marker 136 provided on the outside surface of the turret plate 126 is detected by a sensor (not shown), which in turn sends a detection signal to the control circuit. With the signal received by the control circuit, the motor 128 causes the turret assembly 124 to rotate in the direction that needs the smallest rotation via the worm 129 and the worm wheel 127, bringing the lever 131 of the fixed shaft 130, to which a desired color mark roller 112 is fitted, to a position immediatedly beneath the bearing 135 of the rotary solenoid 134 and stopping the lever 131 at that position. Next, a signal for driving the rotary solenoid 134 is produced by the control circuit to energize the rotary solenoid 134. This causes the bearing 135 to move downward, pushing the bearing 135 from the position A to the position B shown in the figure. The fixed shaft 130 is caused to rotate by means of the pushed lever 131, disengaging the bearing 141 from the groove 140 provided on the positioning cam 139, as described above. Thus, the selected color mark roller 112 comes in contact with the paper web 17 on the platen 142. This causes the color mark roller 112 to start rotation, and a desired color mark is printed on a predetermined position of the paper web 17. When a signal for deenergizing the rotary solenoid is produced by the control circuit, the bearing 135 provided at the tip of the rotary solenoid 134 is returned to the original position A shown in the figure. At the same time, the lever 131 is rotated in the direction of the stopper 133 by the resiliency of the spring 132, while the bearing 141 follows the other area than the groove 140 of the contour of the positioning cam. When the bearing 141 is finally engaged with the groove 140, causing the color mark roller 112 which has been in contact with the paper web 17 to print a color mark to disengage from the paper web 17 to complete the color mark printing process. At this time, since the bearing 141 is engaged with the groove 140, the color mark roller 112 stops rotation and is returned to the original position in preparation for the printing of the next color mark.

Although the positioning cam 139 is provided on the outside surface of the turret plate 126 in this embodiment, the positioning cam 139 may be provided on the inside surface of the turret plate 126.

As described above, since the fixed shafts can be provided on the turret assembly in any desired number, and a plurality of color mark rollers can be provided in parallel, a multitude of color marks can be printed in any desired combinations. Furthermore, the use of only one rotary solenoid for driving the fixed shafts makes the color mark printing device compact in size. The arrangement in which ink is stored within the color mark roller and caused to be released by centrifugal force and absorbed in the impregnated rubber eliminates the need for a separate ink feeding device independently of the color mark printing device, making it possible to make the entire color mark printing device compact in size. In addition, the color mark roller can be easily attached and detached, facilitating the printing of multiple colors as well as the maintenance of the color mark printing device.

(V) Essential Parts Relating to Paper Web Pasting

The paster 25 shown in FIGS. 2 or 8 is used for automatically pasting the paper web 17 for preparing the address label 50 immediately before the paper web 17 is used up.

Figure 22:
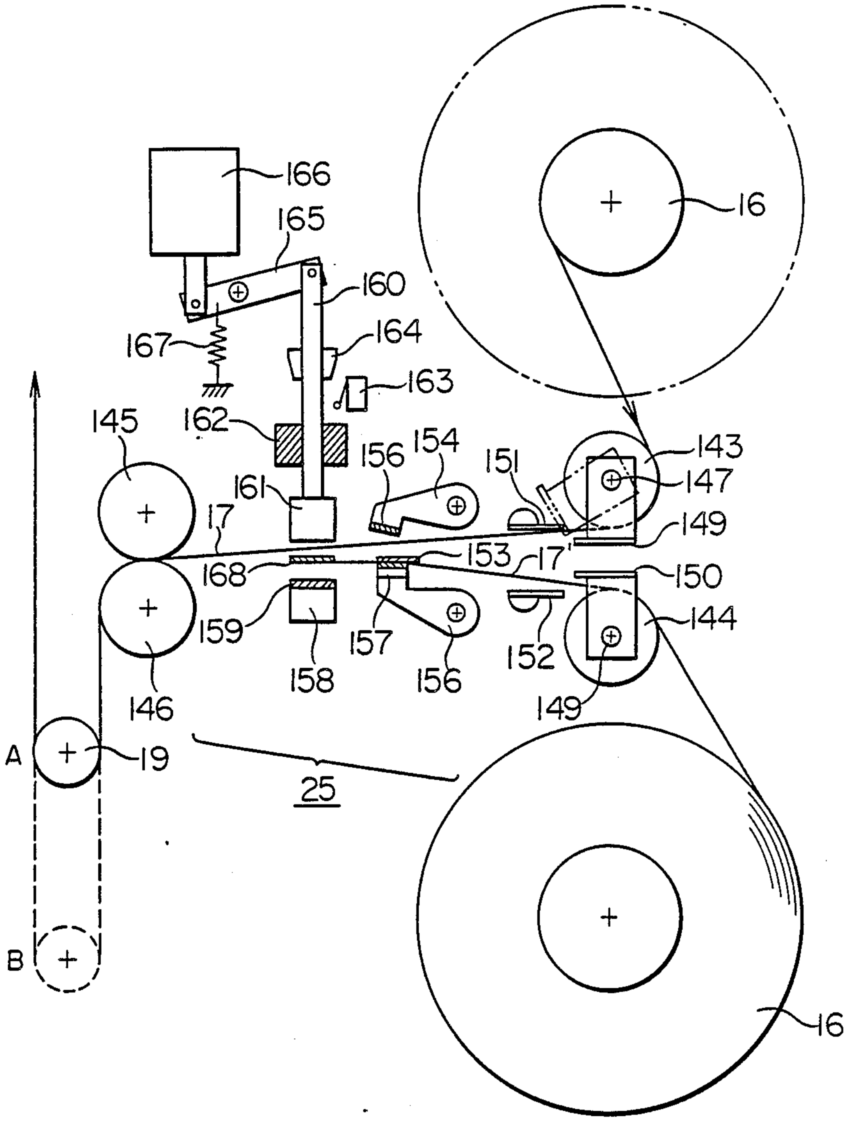
FIG. 22 shows the construction of a paster embodying this invention provided in the address label processing device.

In FIG. 22, paper rolls 16 and 16 are provided as feedstock to the printing unit. In the figure, the paper roll 16 as seen in the upper part of the figure is a roll now being fed to the printing unit, while the roll as seen in the lower part is a roll now on standby. The roll 16 is guided by guide rollers 143 and 144. The paper web 17 is now being fed to the printing unit as the paper web 17 is passed through the gaps of a paper gripping device, and a hold-down device, which will be described later, and taken up by a roller device comprising a backup roller 15 and a take-up roller 146 to feed to the printing unit via a dancer roller 19. On the guide rollers 143 and 144 provided are movable cutting blades 149 and 150 that perform a rocking motion around shafts 147 and 148. Stationary cutting blades 151 and 152 are provided on stationary plates (not shown) to match with the movable cutting blades 149 and 150, respectively, to collaborate to cut the paper web.

The abovementioned paper gripping device has the following construction. Manually operated paper gripping levers 154 and 155 are supported by the respective shafts thereof on the upper and lower surfaces of a plate 153. Magnet rubber pads 156 and 157 are applied to the tip of the paper gripping levers 154 and 155. In the embodiment shown in FIG. 22, the paper web 17 now being fed is passed through the gap between the plate 153 and the magnet rubber pad 156, while the tip of a paper web 17′ now on standby sandwiched between the plate 153 and the magnet rubber pad 157 by the magnetism thereof, and held in almost horizontal position with respect to the hold-down device, which will be described later. To start feeding the paper web 17′ on standby, the operations of the paper gripping levers 154 and 155 are reversed. The paper gripping device has such a construction that when the tension on the paper web 17 built up between the roller device comprising the backup roller 145 and the take-up roller 146 and the guide roller 143 or the guide roller 144 exceeds the magnetic force of the plate 153 and the magnet rubber pad 156 or 157, the paper gripping lever 154 or 155 retracts, producing a gap between the plate 153 and the magnet rubber pad 156 or 157. The hold-down device for applying pressure to adhere the paper web 17 now being fed and the paper web 17′ now on standby is installed in the vicinity of the paper gripping device having the abovementioned construction on the downstream side with respect to the flow of the paper web.

Now, the construction of the hold-down device will be described in the following. A rubber pad 159 is applied onto the upper surface of a stationary block 158. A pressing plate 161 having a width equal to the width of paper roll, provided at the lower end of an action rod 160, is disposed facing the upper surface of the rubber pad 159 with a predetermined interval. The action rod 160 is movably supported by a bearing 162. On the action rod 160 fixedly fitted is a cam 164 that actuates a limit switch 163 when the action rod 160 is moved downward by a predetermined distance, or by a distance between the abovementioned stationary block 158 and the pressing plate 161. The action rod 160 is connected to a solenoid 166 via a lever 156. When the solenoid 166 is energized, the pressing plate 161 provided at the lower end of the action rod 160 lowers toward the stationary block 158. When the solenoid 166 is deenergized, the pressing plate 162 is returned to the original position by the action of a spring 167 provided on the lever 165.

The roller device has such a construction that as the paper web 17 now being fed is about to be exhausted, approaching the tail end thereof, a tail-end detection signal is transmitted by a sensor (not shown) to the roller device to actuate the take-up roller 146 to fast-forward the paper roll. The fast-forwarded paper web is accumulated on the vertically movable dancer roller 19.

The operation of the paster 25 having the aforementioned construction will be described in the following.

Just before the paper web 17 now being fed is used up, an adhesive material 168, such as a double-side coated adhesive tape or paste, is applied in advance to the tip of the paper web 17′ now on standby, while the standby paper web 17′ guided by the guide roller 144 is held between the plate 153 and the magnet rubber pad 157 of the paper gripping lever 155 so that the tip of the paper web 17′ to which the adhesive material 168 is applied is held horizontally in the gap between the rubber pad 159 applied to the stationary block 158 and the paper web 17 now being fed to prepare for pasting.

Figure 23:
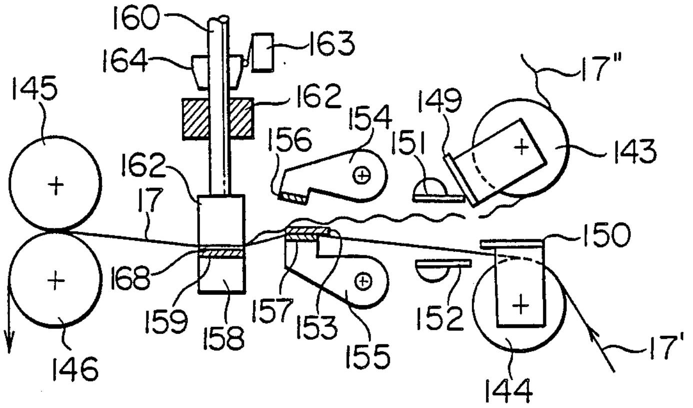
FIG. 23 is a diagram of assistance in explaining paper web pasting and cutting operations.

When a tail-end detection signal indicating that the paper web 17 is almost exhausted is generated, a clutch (not shown) for driving the take-up roller 146 is actuated to cause the take-up roller 146 to fast-forward the paper web 17. As a result, a large amount of paper is fed and accumulated by the dancer roller 19 which lowers down to the position B in the figure. When the dancer roller 19 lowers to the position B, the accumulated paper web 17 is detected by a limit switch, for example, and a signal transmitted by the limit switch releases the fast-forwarding clutch and actuates the solenoid 166 of the hold-down device. Thus, the action rod 160 lowers along the bearing 162, causing the pressing plate 161 to force the tip of the paper web 17' to which the adhesive material 168 is applied onto the paper web 17 to adhere the paper webs 17 and 17'. As the action rod 160 lowers, the cam 164 fixedly fitted to the action rod 160 actuates the limit switch 163 to transmit a signal indicating the pasting of the paper webs 17 and 17' to the movable cutting blade 149 of the cutting device supported by the shaft 147 of the guide roller 143, and further to the solenoid 166. This causes the movable cutting blade 149 to start a rocking motion to cut the paper web 17 fed between the movable cutting blade 149 and the stationary cutting blade 151, as shown in FIG. 23. As the solenoid 166 is deenergized, the action rod 160 is moved upward by the action of the spring 167 to return to the original position.

Figure 24:
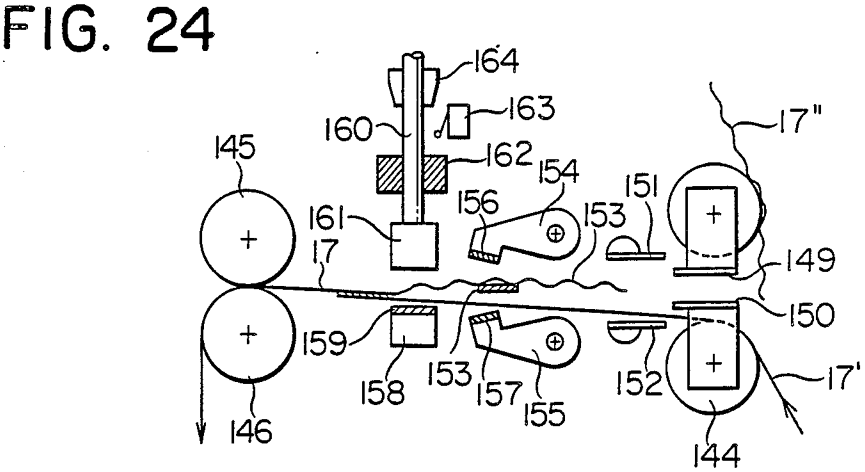
FIG. 24 is a diagram of assistance in explaining the state where upon completion of pasting, a paper roll placed on standby of being fed.

During the period from the energization of the solenoid 166 to the deenergization thereof, in which the pasting of paper webs 17 and 17' and the cutting of the paper web 17 are completed, the printing unit keeps operating, consuming the paper web 17 accumulated by the dancer roller 19. As a result, the dancer roller 19 moves upward from the position B to the position A in the figure. Thus, when the newly pasted paper web is taken up and a tension builds up on the paper web, the magnet rubber pad 157 applied to the paper gripping lever 146 is released from the plate 153 and retracted by that tension, as shown in FIG. 24.

Figure 25:
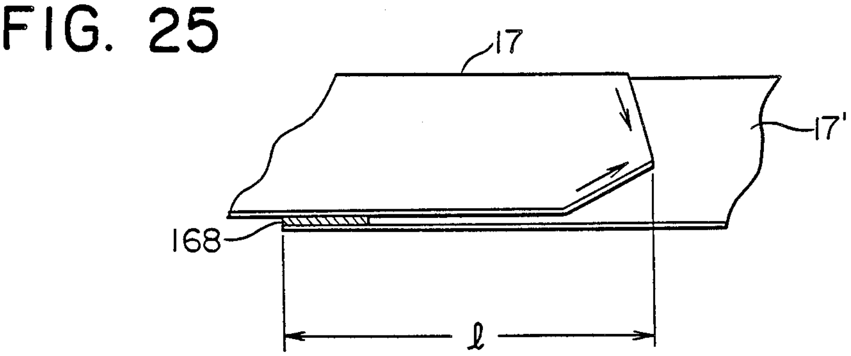
FIG. 25 is a diagram of assistance in explaining the state of a pasted part.

FIG. 25 shows the state where the paper web 17 is cut and the paper webs 17 and 17' are pasted. The figure shows that the paper web 17 is cut by the movable cutting blade 149 and the stationary cutting blade 151 from both sides toward the center thereof, as shown by arrows in the figure. The paster 25 is preset so that the pasting length 1 becomes smaller than the cutting size of a print sheet to permit the print sheet to be discarded as spoilage.

As described earlier with reference to the paper web 17' on standby, a new paper roll is set and guided by the guide roller 143, and held between the plate 153 and the magnet rubber pad 156 applied to the tip of the paper gripping lever 154, while the tip of the standby paper web to which an adhesive material is applied is set between the gap between the paper web now being fed and the pressing unit 161.

By repeating these operations alternately for the two paper rolls 16 and 16, paper rolls can be continuously supplied to the printing unit without interrupting printing operation.

As described above, this invention makes it possible to increase the overall printing speed because no interruption of printing is caused due to paper roll feeding. Particularly where high-speed and volume printing is required as in the case of the printing of address labels, the processing capacity of the printing unit can be substantially increased. Furthermore, spoilage can be reduced to only one printing sheet for every paper roll pasting. The resulting extremely low spoilage can reduce unit cost per printing sheet, contributing to resources conservation.

Furthermore, both in the continuous printing and the intermittent printing of the paper rolls, paper rolls are pasted by temporarily stopping paper feeding at the paper roll pasting unit at the time of pasting. This invention can therefore be applied to ordinary printing machines, printers for data processing equipment, in addition to high-speed printers, by appropriately using the dancer roller.

In the construction shown in FIGS. 22 through 24, paper roll pasting is carried out before the paper web 17 is exhausted, that is, in the state where paper is left on the roll 16 in the upper part of FIG. 22. In addition, the paper web 17 is cut by the movable cutting blade 149 and the stationary cutting blade 151, This causes spoilage to be left invariably on the roll 16 shown in the upper part of the figure.

Figure 26:
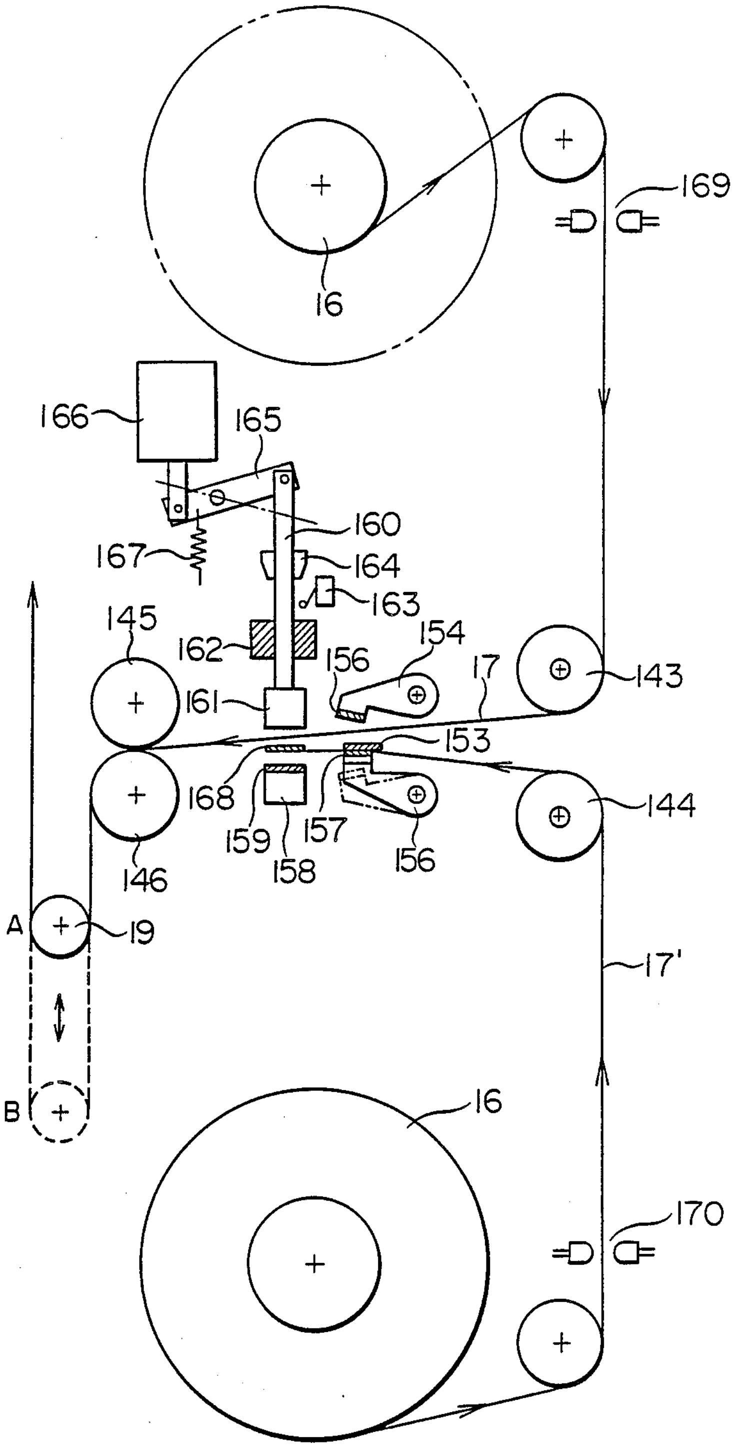
FIG. 26 shows the construction of another embodiment of the paster.
Figure 27:
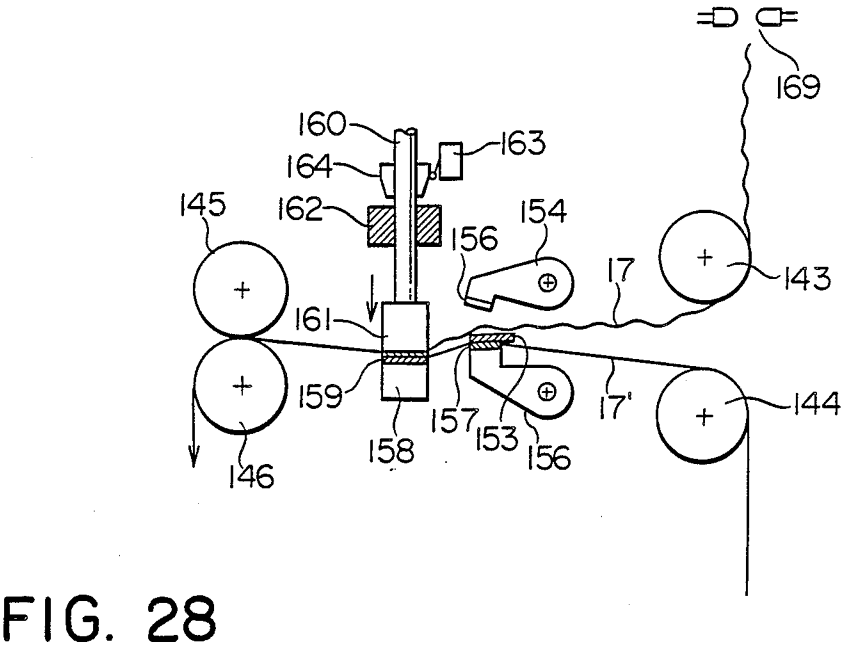
FIGS. 27 and 28 are diagrams of assistance in explaining the state of pasting.

FIG. 26 shown the construction of a paster in which the above problem has been improved. FIGS. 27 are 28 are diagrams of assistance in explaining the state of paper roll pasting. Like numerals correspond with like parts in FIG. 22. Numerals 169 and 170 refer to newly provided sensors.

Figure 28:
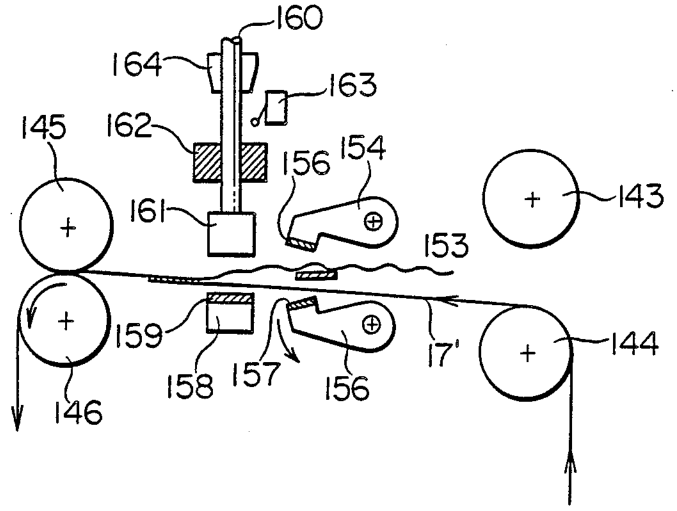

In the embodiment shown in FIGS. 26 through 28, the pressing unit 161 operates provided that the tail end of the paper web 17 now being fed is detected by the sensor 169, as shown in FIG. 27. At the same time, the paper web 17' which has previously been on standby is taken up, as shown in FIG. 28. Since paper roll pasting is carried out only when the tail end of the paper web 17 is detected in the embodiment shown in FIG. 26, the need for the movable cutting blades 149 and 150 and the stationary cutting blades 151 and 152 in the embodiment shown in FIG. 22 can be eliminated.

(VI) Essential Parts Relating to Address Label Tagging

As described earlier with reference to FIGS. 1 and 2, address labels that have been printed and cut into individual sheets are automatically attached on newspaper bundles that have been prepared by the counter/stacker to keep pace with the preparation of the address labels on the basis of on-line processing and are transported on the conveyor.

Figure 29:
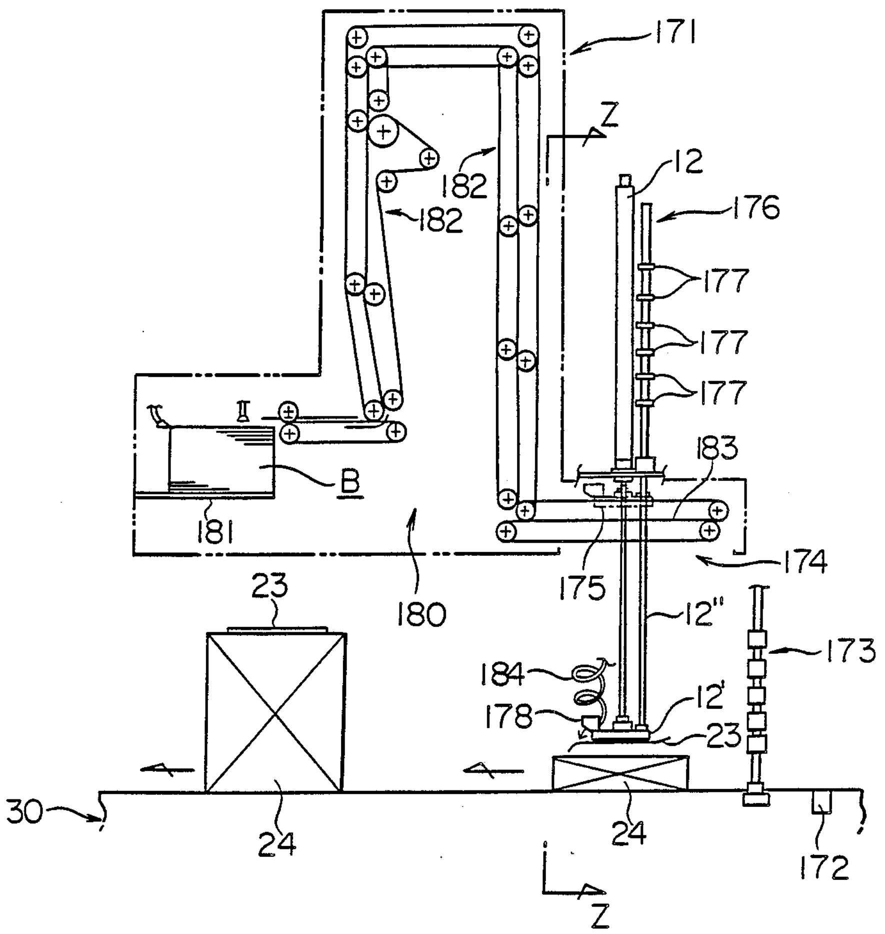
FIG. 29 shows the construction of an address label tagging device embodying this invention.

Although the embodiment shown in FIG. 29 does not have such a construction, as shown in FIGS. 1 and 2, that address labels are prepared and attached on newspaper bundles on the basis of on-line processing, FIG. 29 showns the construction in which address labels prepared in accordance with the preparation of newspaper bundles are automatically attached on the newspaper bundles.

In FIG. 29, a conveyor 30 is equipped with a sensing means 172 for sensing a newspaper bundle 24 as an aggregate of printed matter, and a sensing means 173 for sensing and indicating the level to which the height of a newspaper bundle 24 belongs within the predetermined height range that is graduated into six levels. Above the transport space of the conveyor 30 installed is an address label feeding means 171 having a discharge port 174. The address label feeding means 171 comprises a dispatching unit 180 consisting of a stacking section 181, a dispatching means 182, and a waiting section 183 provided above the discharge port 174 at the tail end of the dispatching means 182; a lowering member 12', an air cylinder 12, for example, which uses the upper part of the waiting section 183 as a waiting position (175 shown by alternate long and two short dash lines in FIG. 29); a lowered height sensing means 176 provided in parallel with the air cylinder 12; and an air jet injecting member 178 connected to the lowering member 12'. Now the address label tagging operation will be described sequentially in the following.

In the address label feeding means 171 shown in FIG. 29, address labels stacked on the stacking section 181 are fed one by one by the dispatching means 182 to the waiting section 183 on the discharge port 174. The dispatching means 182 has a plurality of address label sensing means (not shown) to ensure that address labels are sequentially dispatched positively and without delay by retaining an address label 23 at each position where the address label sensing means is installed in the label dispatching course.

A newspaper bundle 24 travelling on the conveyor 30 is sensed by the sensing means 172 and 173, which generate sensing signals to the lowering section drive and control unit (not shown). That is, the control unit controls the operation of a timer (not shown) for setting the lowering start timing of the lowering member 121, which will be described later, on the basis of an output signal from the sensing means 172 which senses the passage of the bundle 24. Based on an output signal from the sensing means 173 which senses and indicates the height level to which the height of a newspaper bundle 24 belongs within the predetermined height range that is graduated into six levels, the control unit controls the operation of a specific proximity switch 177 for the detected height level among six proximity switches, for example, for controlling the operating time of the timer during operation and the amount of lowering of the lowering member 12', which will be described later. That is, whereas the lowering start timing of the lowering member 12' is controlled in accordance with the height level of the bundle 24, the lowering member 12' is controlled so as to stop at an address label stopping position corresponding to the height level of the bundle 24. Consequently, control is effected so as to prevent the lowering member 12' from interfering with the bundle 24 during address label tagging operation.

Figure 30:
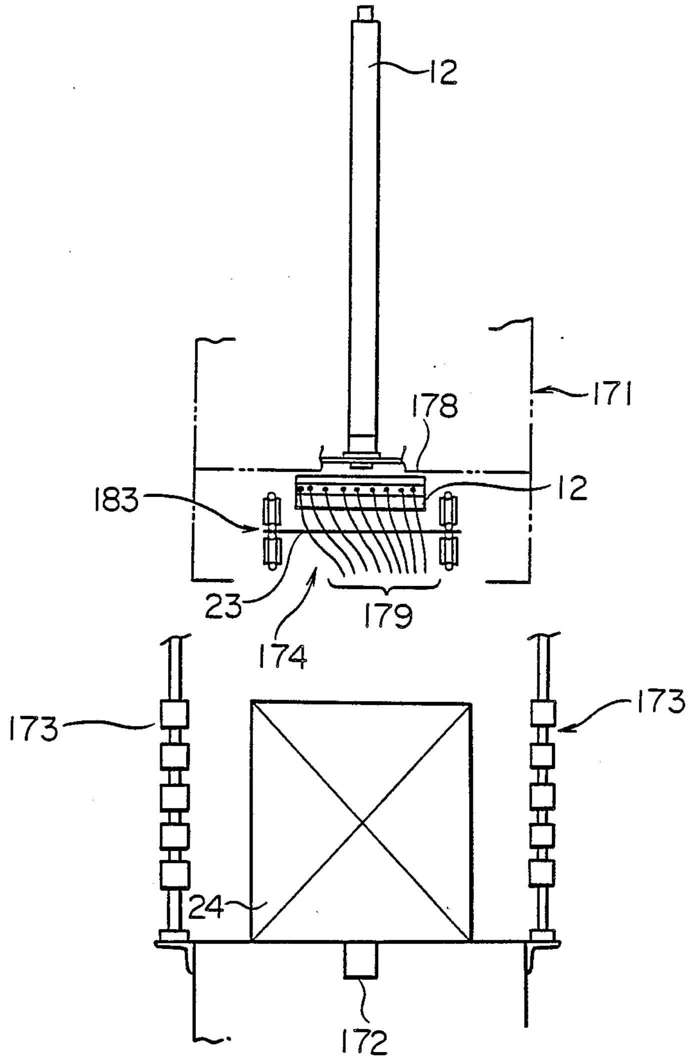
FIG. 30 is a fragmentary view taken substantially in the direction of the arrows Z—Z in FIG. 29.
Figure 31A:
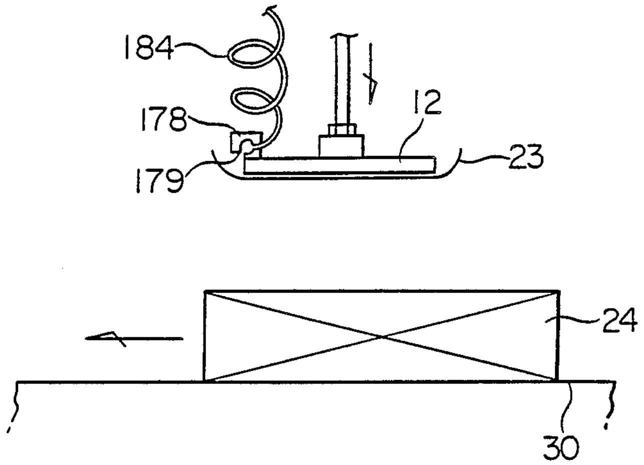
FIGS. 31A through 31C are diagrams of assistance in explaining address label tagging operation.
Figure 31B:
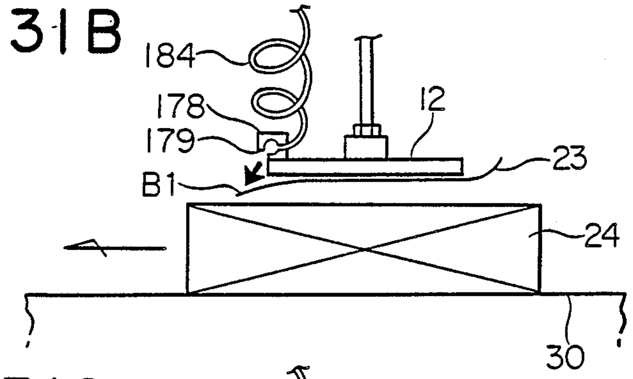
Figure 31C:
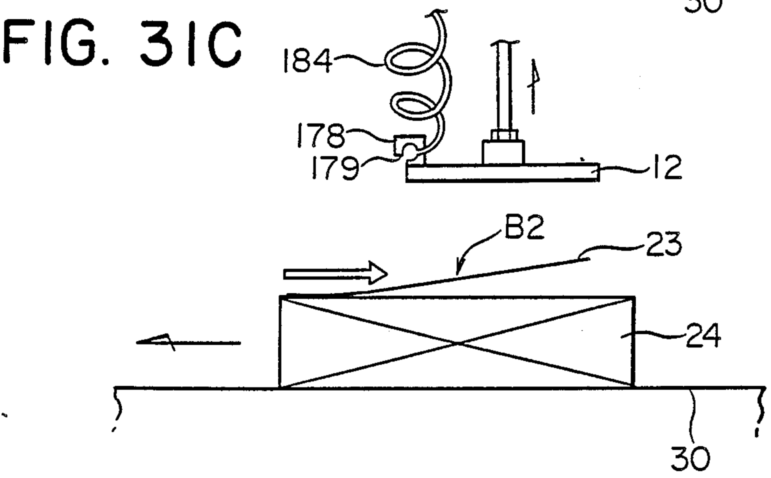

As described above, the lowering member drive and control unit drives the air cylinder 12 to lower the lowering member 12' when the timer controlled on the basis of the output signal of the sensing means 172 and 173 counts a predetermined time. That is, the lowering member 12 quickly lowers from the waiting position 175 and ejects from the discharge port 174 an address label 23, which has been waiting at the waiting position 183 (as shown in FIG. 31A). The lowering member 12 is equipped with a lowering/moving member 12'' for operating the lowering height sensing means 176. When a proximity switch 177 designated in accordance with the abovementioned height level detects the passage of the lowering/moving member 12'', a solenoid valve (not shown) for changing over the driving direction of the air cylinder 12 is once again changed over to drive the air cylinder 12 in the reverse direction, and at the same time, a solenoid valve (not shown) connected between an air jet injecting member 178 and the air jet supply via a pipe 184 is opened to cause the air jet injecting member 178 to inject an air jet toward the tip B1 of the address label in the travelling direction of the bundle 24 and the adjoining part thereof. When the air jet injecting member 178 is provided at the end, on the bundle travelling side, of the lowering member 12' which is slightly smaller than the address label 23, it is desirable to install an air jet nozzle 179 at an angle inclining downward and outward with respect to the lowering member 12' (as shown in FIGS. 30 and 31B). The air jet injection is discontinued by closing the solenoid valve when the timer (not shown) that starts time counting upon receipt of a signal from the proximity switch 177 completes time counting. By lifting the lowering member 12' by operating the air cylinder in the reverse direction and injecting the air jet, the address label 23 is placed in such a fashion that the tip B1 of the bundle and the adjoining part thereof come in contact with the upper surface (on which the address label is attached) of the bundle 24. At this time, the bundle 24 carries the address label 23 which comes in contact with the address label attaching surface as the bundle 24 travels on the conveyor 30. The surface B2 (front surface) of the address label 23 is therefore exposed to the pressure of the air jet in the travelling direction of the bundle 24. The air pressure helps attach the address label 23 positively and accurately on the address label attaching surface (as shown in FIG. 31C).

Furthermore, when the lowering member 12' lifts to return to the waiting position 175 above the address label waiting section 183, the returning of the lowering member 12' is confirmed by an appropriate means (not shown), whereby the next address label 23 is fed to the waiting section 183. The next address label 23 is attached on the next bundle 24 in the same label attaching sequence as described with reference to FIGS. 29 through 31.

Figure 32A:
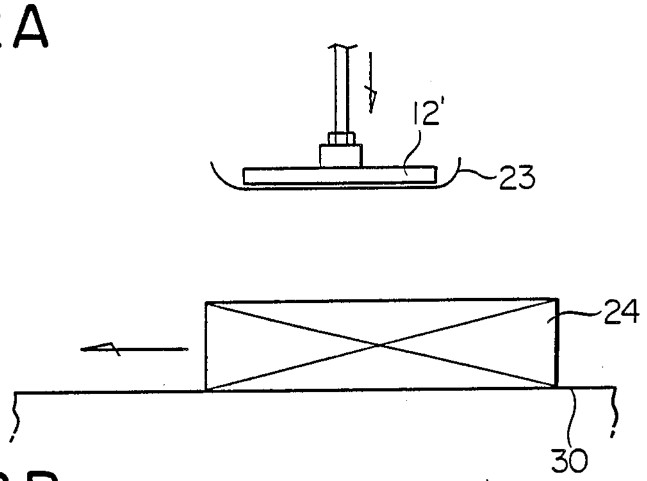
FIG. 32A (PRIOR ART)
FIGS. 32A through 32C are diagrams of assistance in explaining address label tagging operation by the conventional means.
Figure 32B:
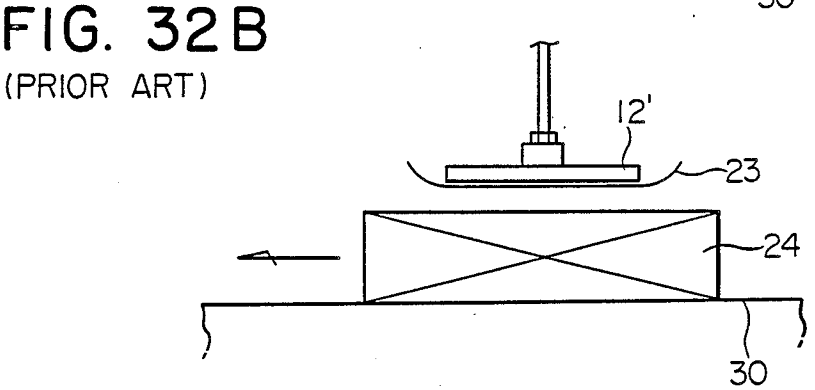
FIG. 32B (PRIOR ART)
Figure 32C:
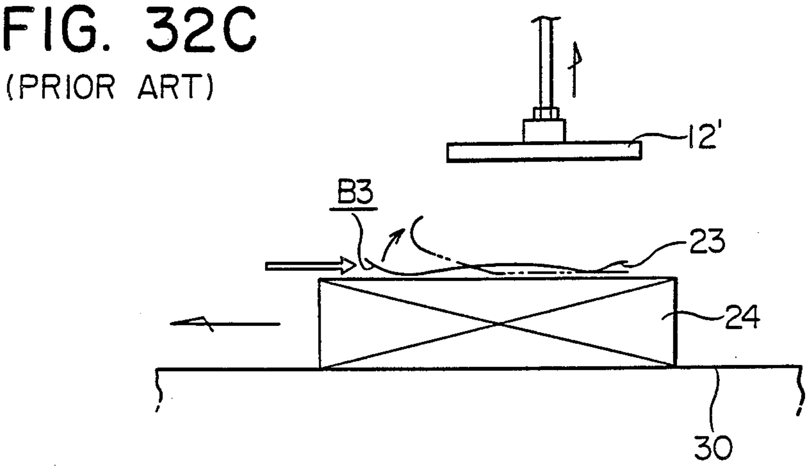
FIG. 32C (PRIOR ART)

Heretofore, a means for automatically placing address labels on bundles 24 is known. FIGS. 32A through 32C describe problems associated with the prior art.

That is, there has been a prior art in which an address label 23 is lowered by a lowering member 12', as shown in FIG. 32, and the lowering operation of the lowering member 12' is discontinued just before the lowering member 12' comes in contact with the bundle 24, as shown in FIG. 32B, and the address label 23 is allowed to drop by the gravity thereof onto the bundle 24, as shown in FIG. 32C. This prior art, however, has the following problems. That is, since the falling behavior of the address label 23 is not stable, the position at which the address label is attached on the label attaching surface of the bundle 24 tends to fluctuate significantly. Furthermore, depending on the position at which the address label 23 first comes in contact with the label attaching surface of the bundle 24, or depending on the travelling state of the bundle 24, the surface B3 (rear surface) near the tip of the address label 23 in the travelling direction of the bundle 24 may be flapped up due to the pressure of the air jet, resulting in the displacement of the label or the separation and falling-off of the label from the label attaching surface of the bundle 24. In the label attaching means according to this invention described earlier with reference to FIGS. 29 through 31, the problems encountered with the abovementioned prior art have been solved. That is, the present invention makes it possible to attach an address label 23 on a bundle accurately and positively while eliminating inconveniences such as the collapse of the bundle due to the interference of the bundle by the lowering member 12'. This permits the contents of an address label to be read in the downstream of the address label attaching equipment, and also permits newspaper bundles to be sorted on the basis of the read results.

Figure 33:
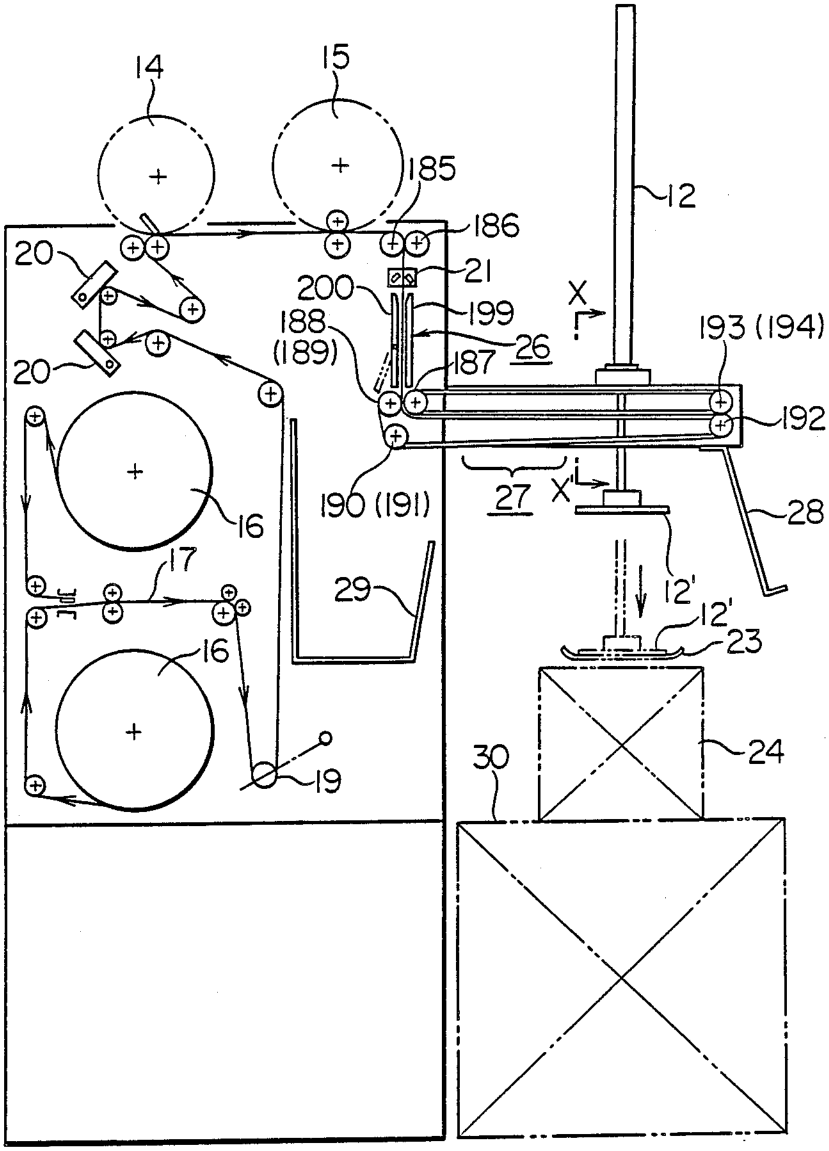
FIG. 33 shows the construction of an embodiment for address label automatic tagging.
Figure 34A:
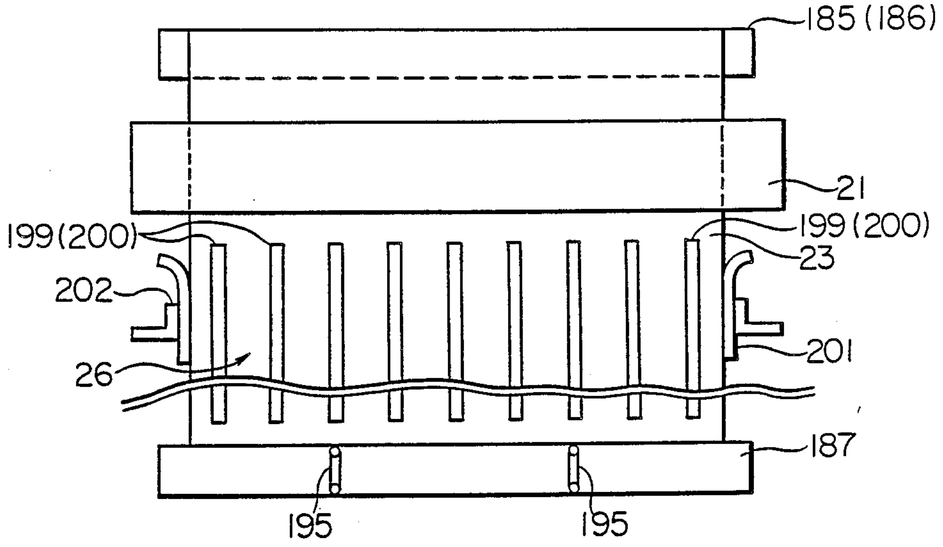
FIG. 34A is a diagram of assistance in explaining an address label relaying section.
Figure 34B:
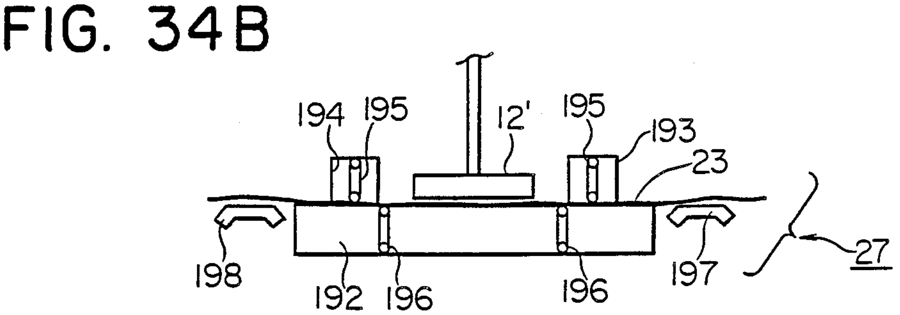
FIGS. 34B and 34C are diagrams of assistance in explaining an address label feeding section.
Figure 34C:
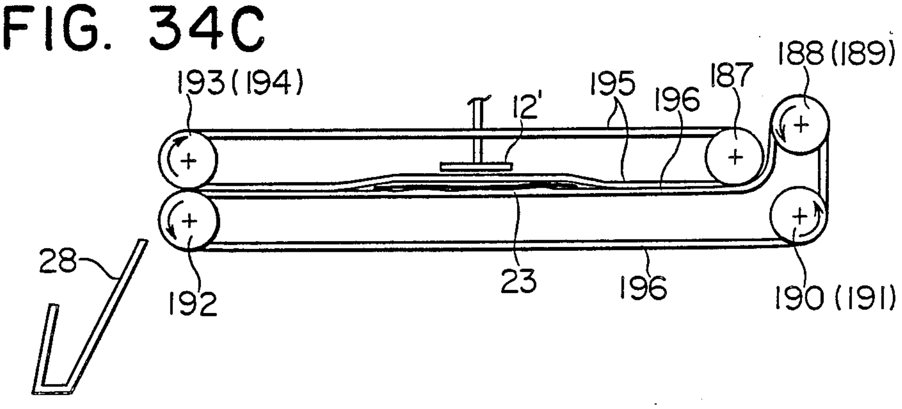

FIG. 33 shows the construction in which address labels successively printed on the basis of on-line processing are cut piece by piece, and attached on newspaper bundles prepared by the counter/stacker in accordance with the preparation of the address labels and transported on the conveyor, as described earlier with reference to FIGS. 1 and 2, FIG. 34A shows the construction of the address label relaying section, and FIGS. 34B and 34C shown the construction of the address label feeding section.

Most of like numerals in the figures correspond with like parts shown in FIGS. 2 and 29. Numerals 185 through 194 refer to rollers; 195 and 196 to belts; 197 and 198 to address label placement guides; 199 and 200 to latticed frame guides for guides; 201 and 202 to vertical guides, respectively.

FIG. 34B shows the cross sectional view taken along the line X—X' in FIG. 33. FIG. 34C is a diagram illustrating the details of the belt layout in the address label feeding section shown in FIG. 33, with a slightly reduced scale in the longitudinal direction compared with FIG. 34B.

The paper web on which printing has completed in the character printing head 20, the color band printing section 14 and the color mark printing section 15, as described above, is fed to the cutter 21 via the rollers 185 and 186 shown in FIG. 33. In the cutter, the paper web is cut into individual address labels, which are then fed to the address label relaying section 26.

The address label 23 fed to the address label relaying section 26 is sandwiched by the rollers 187, 188, 189, 190 and 191 and the belts 195 and 196, as shown in FIG. 34B, and fed to the position at which the lowering member 12' operates, as shown in FIG. 34C. The operations required for the lowering member 12' to place an address label on a bundle 24 are essentially the same as the operations described referring to FIGS. 29 through 31.

The construction of the address label relaying section 26 which receives address labels cut by the cutter 21 is specifically illustrated in FIG. 34A. In the relaying section 26, latticed frame guides 199, 199 --- and 200, 200 ---are provided so that the cut address labels 23 are received in the gaps between the latticed frame guides 199, 199 ---and the latticed frame guides 200, 200 ---. In order to prevent the received address labels from shifting sideways in FIG. 34A, vertical guides 201 and 202 are provided.

It has also been considered to provide one-piece sheet guides 199, 199 --- and 200, 200 ---, instead of the latticed frame guides 199, 199 --- and 200, 200 --- shown in the figure. One problem with this arrangement is that static charge may build up between the address labels 23 and the one-piece sheet guides, making it difficult to receive the address labels 23 at axact positions.

The address labels received in the address label relaying section 26 are held between the rollers 188 and 189, as shown in FIG. 34C, and between two upper belts 195 arranged horizontally with an interval and two lower belts arranged horizontally with an interval, as shown in FIG. 34B, and fed in such a fashion as shown in FIG. 34C.

In FIG. 34B, address label placement guides 197 and 198 are provided on the left and right sides of the roller 192. The address label placement guides 197 and 198 are used for supporting both side edges of the address labels 23 during transportation, as shown in FIG. 34B. At the same time, the arrangement that the interval between the upper belts 195 is made larger than the interval between the lower belts 196 produces a force to pull and expand the address label toward both side edges thereof, as is evident from FIG. 34B. The relative positions of the belts 195 and 196, together with the existence of the guides 197 and 198, prevents the address label during transportation from unwantedly sagging.

(VII) Essential Parts Relating to Address Label Recovery

As shown in FIG. 2, the address labels 23, printed and cut into individual sheets, are fed to the address label feeding section 27 and automatically placed on the newspaper bundle 24 by the action of the air cylinder 12. In general, the address labels 23 and the newspaper bundles 24 are prepared and transported on conveyors on the basis of on-line processing, as described above. It is necessary, however, to make provision for preparing off-line address labels alone as occasion demands. To this end, an address label recovery section 28 or an address label recovery section 29 is provided in the construction shown in FIG. 2.

Figure 35A:
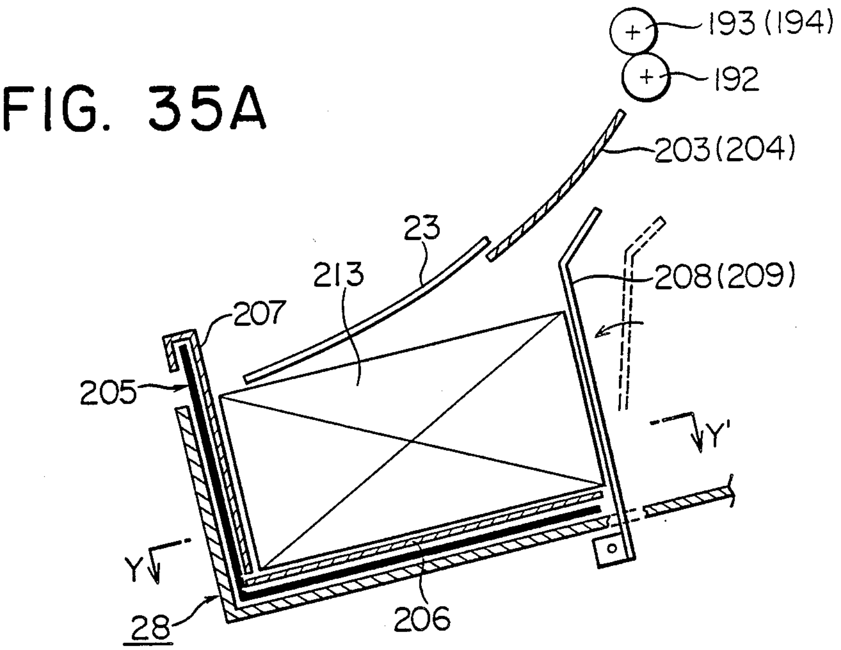
FIGS. 35A through 35C are diagrams of assistance in explaining an address label recovery section.
Figure 35B:
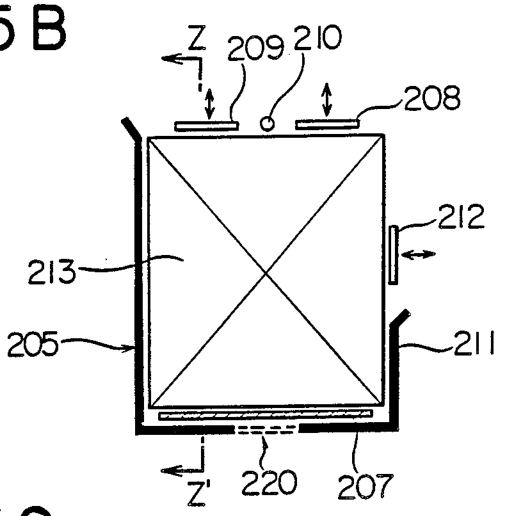
Figure 35C:
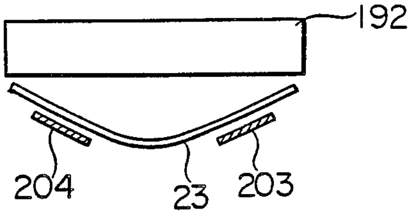

FIGS. 35A through 35C are diagrams of assistance in explaining the construction of the address label recovery section 28. FIGS. 35A and 35B is a sectional view taken along the line Z—Z' in FIG. 35B, and FIG. 35B is a sectional view taken along the line Y—Y' in FIG. 35A. FIG. 35C is a schematic representation of the slider shown in FIG. 35A. In the figures, numeral 23 refers to an address label; 28 to an address label recovery section (see FIG. 2); 192, 193 and 194 to rollers (see FIG. 34C); 203 and 204 to sliders; 205 to a cassette; 206 to a base plate; 207 to a blind plate; 208 and 209 to label rear supports; 210 to a guide pin; 211 to a guide plate; 212 to a label side support; and 213 to a stack of recovered address labels, respectively.

In the address label recovery section 28, a cassette 205 is detachably provided. On the bottom of the cassette 205, detachably provided is a base plate 206. At the left end of FIG. 35A, detachably provided is a blind plate 207. The roles of the base plate 206 and the blind plate 207 will be described later.

In the address label recovery section 28, label rear supports 208 and 209 and a label side support 212 are provided, as shown in FIG. 35B, so that the oncoming address labels are housed in the cassette in good order by aligning the address labels 23 against these supports 208, 209 and 212. The guide pin 210 and the guide plate 211 shown in FIG. 32B are provided in the cassette 205.

As an address label 23 being recovered is passed through the rollers 192, 193 and 194, the address label 23 slides along the sliders 203 and 204 into the cassette 205, as shown in FIGS. 35A and 35C. At this time, the address label 23 drops into the cassette safely in such a fashion that the center thereof sags down, as shown in FIG. 35C. The falling address labels are aligned at the rear and side edges by the label supports 208, 209 and 212.

If the address label stack 213 in the cassette 205 has a considerably large number of labels, the entire cassette 205 is extracted by inserting a hand into a window provided on the address label recovery section 28, as will be described later. If the label stack 213 has a relatively small number of labels, both the base plate 206 and the label stack 213 are extracted by inserting a hand into a window provided on the cassette 205, as will be described later. At this timek, the blind plate 207 is removed, with the cassette 205 left in the address label recovery section 28.

Figure 36:
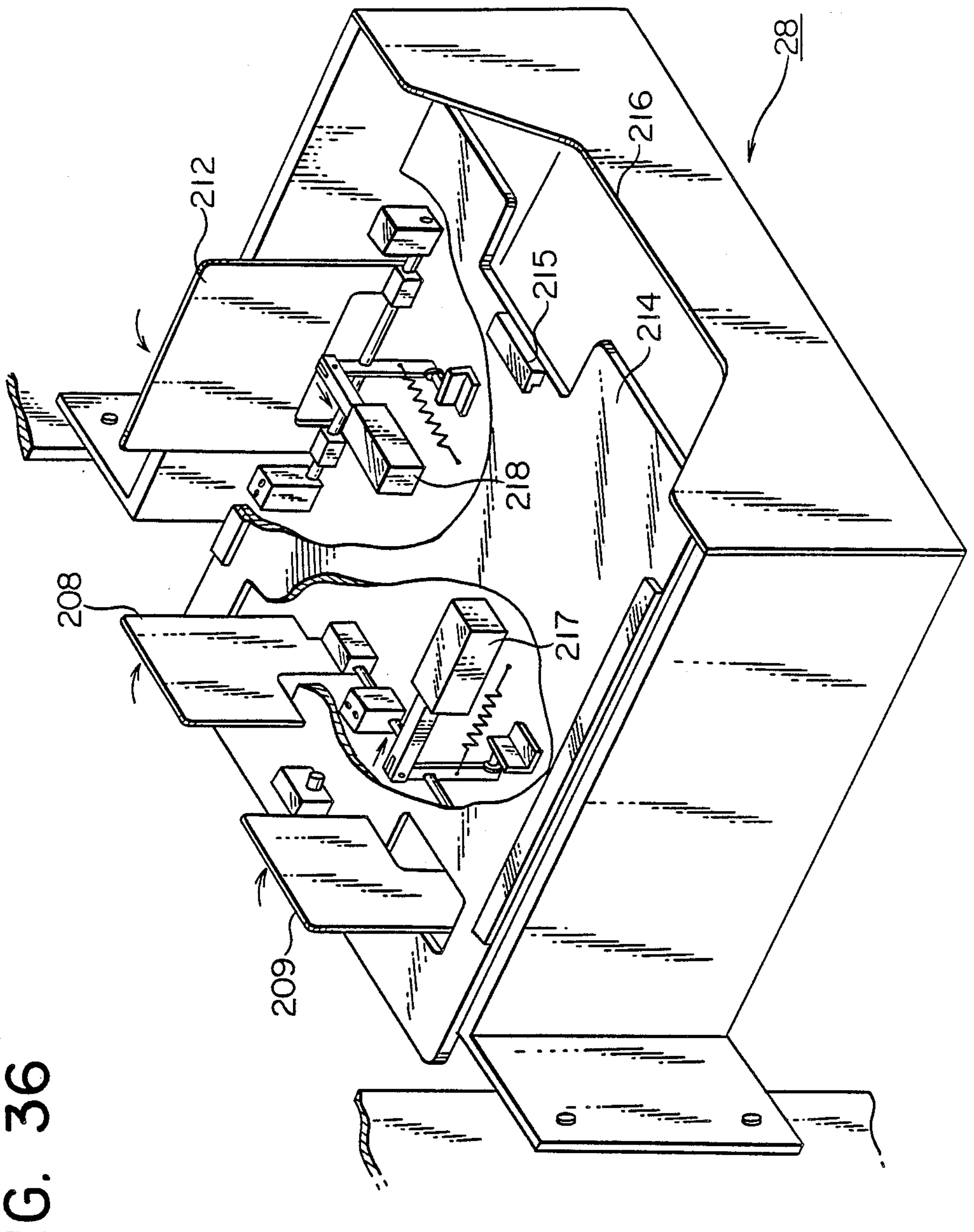
FIGS. 36 and 37 show the construction of an addrees label recovery section embodying this invention.

FIG. 36 shows the construction of the address label recovery section 28. Numerals 28, 208, 209 and 212 correspond with like parts in FIG. 35. Numeral 214 refers to a base plate of the address label recovery section; 215 to a notch provided on the base plate 214; 216 to a window provided on the address label recovery section; and 217 and 218 to magnets for driving label supports, respectively.

Figure 37:
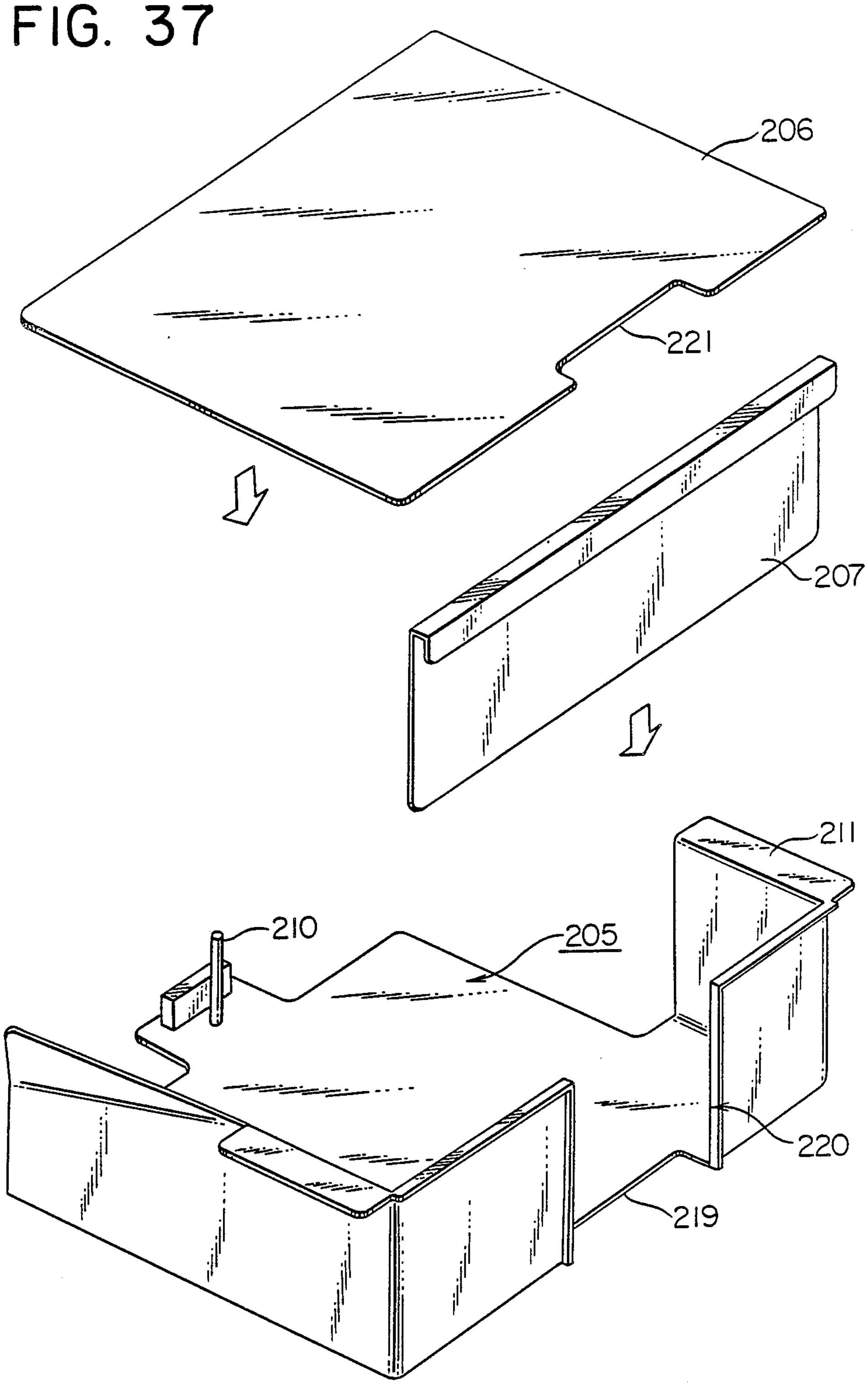

A cassette 2-5 shown in FIG. 37 is set on the base plate 214 in the address label recovery section 28 shown in FIG. 36. The cassette 205 has a notch 219 and a window 220. The notch 219 corresponds with the notch shown in FIG. 36, and the window 220 with the window 216 shown in FIG. 36. The depth of the notch 219 shown in FIG. 37 is made smaller than the depth of the notch 215 shown in FIG. 36 so that the notch 219 can be lifted upward from under by a hand to remove the entire cassette 205.

A base plate 206 shown in FIG. 37 is placed on the bottom surface of the cassette 205 in such a manner that the notch 221 provided on the base plate 206 agrees with the notch 219 provided on the cassette 205. The depth of the notch 221 shown in the figure is made smaller than the depth of the notch 219 so that when the address label stack has a small number of labels, the notch 221 can be manually lifted upward from under to remove the base plate 206 from the cassette 205. A blind plate 207 is provided to close the window 220 provided on the cassette 205. If the address label stack has a small number of labels, the window 220 is used for inserting a hand to remove the label stack, together with the base plate 206, as described above. If the window 220 is left open, the air present under the address label 23 may escape from the window 220, with the consequence that the address label 23, which slides on the sliders 203 and 204 into the cassette 205, would unwantedly sag at the tip thereof, leading to failure of the address label 23 to stably land onto cassette 205. The blind plate 207 is used to normally close the window 220 to improve the landing performance of address labels 23 onto the cassette 205.

(VIII) Essential Parts Relating to Printing of Bar Codes on Address Labels

As shown in FIGS. 3A, 3B and 4, the address label 50 has bar codes printed on the four corners thereof, so that the information on the address label can be read from the bar codes. The bar codes are printed by the printing head shown in FIG. 2. The format in which bar codes are printed is determined by the instruction received by the printing controller from the line editing buffer controller 9.

If a number of bar code patterns representing various types of information are stored in the memory, from which a desired code pattern is selected for printing, an enormous memory capacity would be required because there are a large number of bar code patterns involved.

This invention is also intended to solve this problem. In the following, bar code printing according to this invention will be described.

Figure 38:
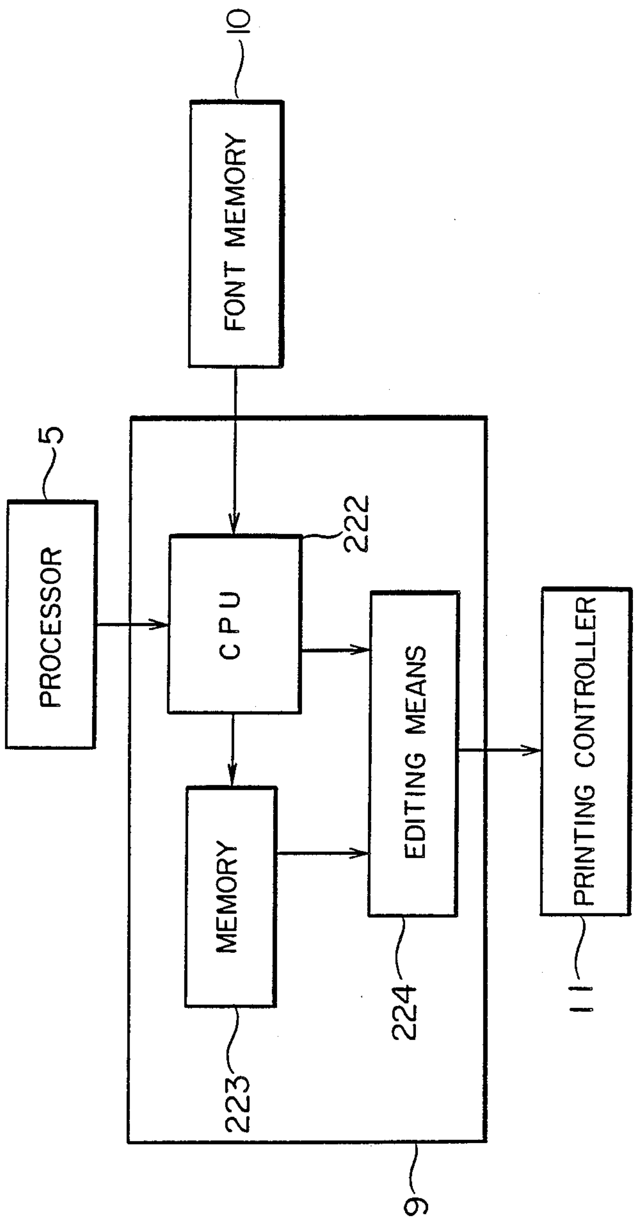
FIG. 38 is a block diagram illustrating the construction of a bar code printing section.

FIG. 38 shows the construction of the essential parts of the line editing buffer controller 9 shown in FIG. 1. Numerals 5, 9, 10 and 11 in the figure correspond with like part in FIG. 1. Numeral 222 refers to an internal control unit; 223 to a memory; and 224 to an editing means, respectively.

Figure 40:
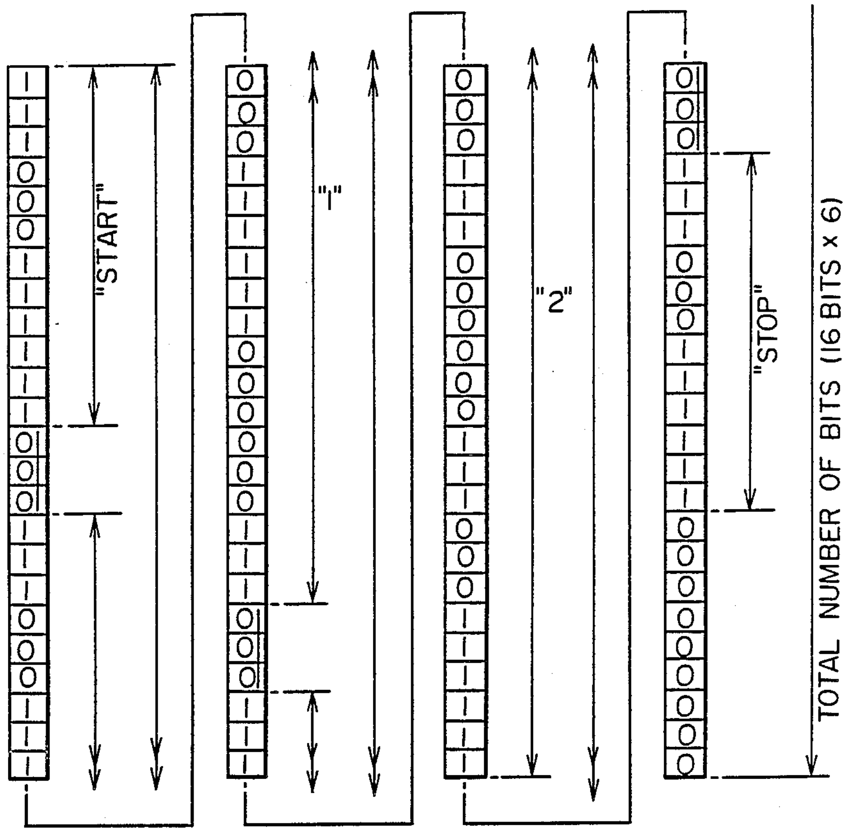
FIG. 40 shows the format of a complied sub bit pattern embodying this invention.

In the following, the embodiment shown in FIG. 38 will be described in detail, referring to FIGS. 39 through 41.

In FIG. 38, the processor 5 is used for inputting character information on bar codes being output and editing information for output layout. The editing information consists of font address information showing locations for a compiled sub bit pattern (see FIG. 40) stored in the memory 223 and/or or a bar-code bit pattern (see FIG. 41), print address information showing locations for bar codes being printed by the printing controller, directional information showing printing direction, and magnification information (magnification factor and point number) showing the size of the bar codes being printed.

The sub bit pattern stored in advance in the font memory 10 is a bit pattern table in which black bars of a bar code corresponding to characters (0 through 9, and "start" and "stop" in the embodiment shown in FIG. 39) being output are represented by "1s", and spaces between black bars by "0s", and the bits whose number is proportional to the widths of the black bars and the spaces are arranged in a one-dimensional array. The embodiment shown in FIG. 39 represents a sub bit pattern where the types of bar codes being output are expressed in the so-called "2 out of 7" mode, and a bit pattern corresponding each character is composed of 32 or 16 bits. At the end of bit patterns, added are a plurality of "0" bits (underlined portions in FIG. 39), which are disregarded when compiling a compiled sub bit pattern, as will be described later, referring to FIG. 40. In the following, the construction shown in FIG. 38 will be described.

(1) First, character information and editing information, as described above, are input in the processor 5.

(2) The internal control unit 222 transfers the editing information to the editing means 224, and, based on the character information, generates a compiled sub bit pattern and/or bar-code bit pattern corresponding to the character information for storage in the memory 223. In the following, the processing for generating the bar-code bit pattern will be described taking an example.

(2-1) Assume that the bar code being output represents a value "12". Then, the internal control unit 222 extracts bit patterns corresponding to "1", "2", "start and stop" from the sub bit pattern table (shown in FIG. 39) stored in the font memory 10, compiles a compiled sub bit pattern (shown in FIG. 40) by interposing "0s" corresponding to the predetermined number bits between each bit pattern and arranging the bit patterns in a one-dimensional array (in the Y direction shown in FIG. 40). The compiled sub bit pattern shown in FIG. 40 is compiled so that the total number of bits is an integral multiple of 16 bits by adding an appropriate number of "0" bits to the end of the bit patterns.

Figure 41:
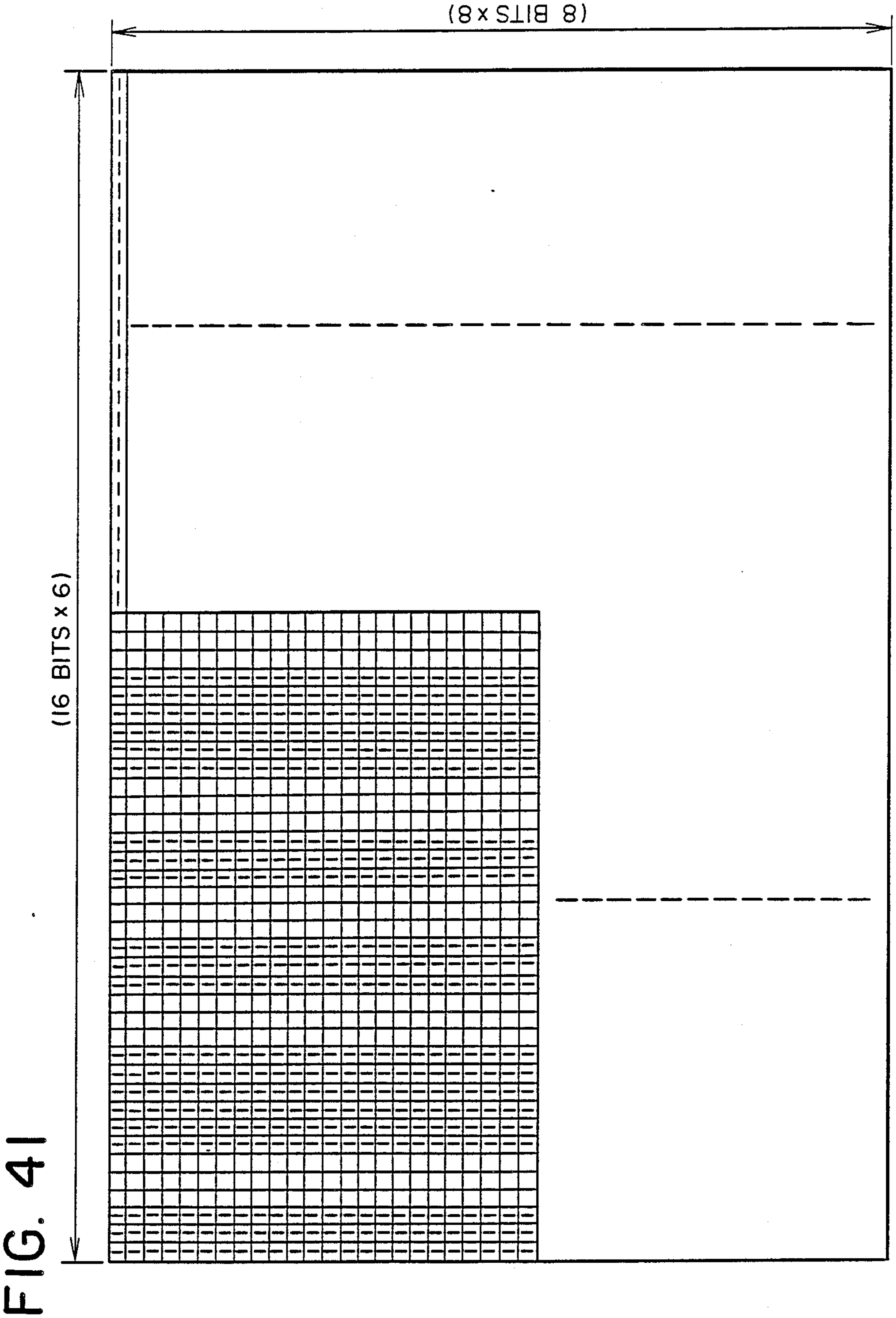
FIG. 41 shows the format of a bar code bit pattern embodying this invention.

(2-2) Next, the internal control unit 222 expands each bit in the abovementioned compiled sub bit pattern into a two-dimensional array to produce a bar-code bit pattern shown in FIG. 41, and stores the compiled sub bit pattern and/or the bar-code bit pattern in the memory 223. The number of two-dimensional bits in the bar-code bit pattern shown in FIG. 41 can be of a size of (16 bits×6)×(8 bits×8). Space frames in FIG. 41 represent "0" bits.

(3) In the meantime, the editing means 224 performs the following editing processing on the basis of the editing information transferred via the internal control unit 222. The editing information is composed of (i) information on the location on a printing paper surface of a bar-code image being output (having the coordinates (X, Y) of the print start point of the bar-code image, with the paper feeding direction assumed as the X axis, and a predetermined reference point on the printing paper surface as datum, (ii) magnification information showing the size of the bar-code image (point number (P) and magnification factor (C)), (iii) directional information showing the direction (vertical or horizontal) of the bar codes being output, and (iv) font address information showing the locations of the compiled sub bit patterns and/or the bar-code bit patterns terns stored in the second memory 4.

The address controller provided in the editing means 224 is caused to count the number of paper feeding pulses for the printing controller 11, compare the number of pulse counts (A) with the X coordinate value (X) for the print start point, and count the Y address on the output side, starting from the point at which A=X. And, when the Y address count value (B) counted by the address controller equals to the Y coordinate value (Y) for the print start point, that is, when B=Y, the compiled sub bit pattern and/or the bar-code bit pattern stored in the memory 223 are read in accordance with an instruction given by the font address to control the bar-code output means 6 to start printing. At this time, if the direction of the bar code being printed is parallel with the paper feeding direction, that is, if printing is in a lateral mode, the bar-code bit pattern is read laterally. If the direction of bar codes is vertical to the paper feeding direction, that is, if printing is in a vertical mode, then the bar-code code bit pattern is read vertically. Printing is performed by the input point number (P) in the paper feeding direction (in the X-axis direction). Printing is continued so long as P remains larger than zero as 1 is subtracted from P every time one line is printed. Furthermore, every time lines are printed up to the number of lines equal to the number of magnification information (C) given in integers more than 1, 1 is added to the font address to change the font address. In this way, the bit pattern at each font address is printed. Expansion in the Y direction according to the number of magnification information (C) is carried out by continuously printing each bit in each font address up to C pieces. When the directional information on the direction of bar code specifies lateral printing, each line can be continuously printed by the number of input points by reading the first line of the compiled sub bit pattern or the bar-code bit pattern and not adding the first line to the font address.

As described above, when the character information and the editing information for a bar code being output are input, a compiled sub bit pattern and/or a bar-code bit pattern corresponding to the bar code being output are produced, and a bar code of a desired size is printed at a desired location on the printing paper surface on the basis of the editing information.

As described above, this invention has a number of advantages in that a memory of a large capacity for storing bar-code information that has heretofore been required for conventional type equipment can be eliminated, and that the construction of equipment can be simplified and production cost can be reduced. Storage of sub bit patterns, in place of conventional bar-code patterns, will suffice for the purpose. This leads to substantial reduction in the time required for pattern storage, and reduced efforts in pattern storage, contributing much to reduced work load to operators as well as to improved work accuracy.

What is claimed is:

1. An address label preparation processing system for printed matter dispatching, having a counter/stacker for preparing printed matter bundles based on data on the number of copies per bundle received from an address label processing device having an address label printing function; printing address labels for said printed matter bundles and attaching address labels on said printed matter bundles as said printed matter bundles are prepared by said counter/stacker and transported by a conveyor; said address label processing device incorporating a character font and character enlarging mechanism so as to be capable of printing address labels in accordance with address printing data transmitted by a host computer; said host computer controlling so as to sequentially allocate said address printing data and said data on the number of copies per bundle among a plurality of address label processing devices; said counter/stacker transporting printed matter bundles on a conveyor in accordance with the given data on the number of copies per bundle and the serial number of bundles; said address label processing device printing address labels on-line by relating said address labels to preparation of said bundles, and sequentially attaching said address labels prepared on-line on said printed matter bundles.

2. An address label preparation processing system for printed matter dispatching operation set forth in claim 1 wherein said address label processing device has a plurality of printing heads for forming images on a continuous paper web provided to prepare address labels; said printing heads taking over a portion of printing work.

3. An address label preparation processing system for printed matter dispatching operation set forth in claim 2 wherein said address label processing device has a color band printing section for printing color bands on said continuous paper web.

4. An address label preparation processing system for printed matter dispatching operation set forth in claim 2 wherein said address label processing device has a color mark printing section for printing a colored mark on a predetermined area on said continuous paper web.

5. An address label preparation processing system for printed matter dispatching operation set forth in claim 2 wherein said address label processing device has a paster for pasting said continuous paper webs on the upstream side of said printing heads.

6. An address label preparation processing system for printed matter dispatching operation set forth in claim 2 wherein said address label processing device has a cutter for cutting a paper web on which said printing has been carried out.

7. An address label preparation processing system for printed matter dispatching operation set forth in claim 6 wherein said address label processing device has an address label sorting/folding section on the downstream side of said cutter to sort address labels for non-combined transportation from address labels for combined transportation, and fold said address labels for combined transportation.

8. An address label preparation processing system for printed matter dispatching operation set forth in claim 6 wherein said address label processing device has an address label feeding section on the downstream side of said cutter, and an air cylinder for attaching address labels fed by said address label feeding section on said printed matter bundles.

9. An address label preparation processing system for printed matter dispatching operation set forth in claim 6 wherein said address label processing device has an address label recovery section on the downstream side of said cutter.

10. An address label preparation processing system for printed matter dispatching operation set forth in claim 1 wherein said address label processing device has a function of searching through a font memory storing bar-code bit patterns corresponding to numerical values comprising a bar code for a specific bar code bit pattern, and preparing a compiled sub bit pattern corresponding to a plurality of numerical values based on said bar-code bit pattern, and a function of preparing a bar-code bit pattern by expanding said compiled sub bit pattern in a two-dimensional fashion, so that printing is carried out by said printing head based on said compiled sub bit pattern and/or said bar-code bit pattern.

11. An address label preparation processing system for printed matter dispatching, employing a host computer, a counter/stacker for preparing printed matter bundles, and a plurality of address label processing devices each having an address label printing function, comprising: allocating address printing data and data on a number of copies per bundle to each of the plurality of address label processing devices and transmitting the address printing data and data on the number of copies to the plurality of address label processing devices; transporting printed matter bundles on a conveyor from the counter/stacker in accordance with the data on the number of copies per bundle; printing number and address information on a label at each of a plurality of address label processing devices; preparing a plurality of printed labels that is imprinted with data corresponding to the address and number of copies on-line by relating each of the labels to a bundle; and, attaching the prepared label on a bundle as the bundle is transported to the associated one of a plurality of address label processing devices and sequentially attaching address labels prepared on-line on printed matter bundles.

12. An address label preparation processing system for printed matter dispatching operations comprising: control bus means for transmitting address printing data and data on the number of printed matter copies per bundle of copies; a counter/stacker connected to said control bus means for receiving data on the number of copies per bundle and preparing printed matter bundles based on data on the number of copies per bundle received from said control bus means; a plurality of address label processing devices connected to said control bus means for receiving address printing data and data on the number of copies per bundle, each address label processing device including control circuit means, means for printing labels, label feeding means, and label attaching means, each of said address label processing devices printing and preparing printed labels imprinted with data corresponding to the address printing data and data on the number of copies per bundle on-line, as the bundle is being formed and transported by a conveyor belt to one of a plurality of address label processing devices, each of said plurality of address label processing devices attaching the prepared label on the bundle in accordance with the relation between the labels and the bundles.

13. An address label preparation processing system according to claim 12, wherein: said control circuit associated with each of said address label processing devices controls a plurality of printing heads for forming images on a continuous paper web provided to prepare address labels.

14. An address label preparation processing system according to claim 12, wherein: each of said address label processing devices includes a color band printing section for printing color bands on said continuous paper web, said control circuit controlling a color band printing.

15. An address label preparation processing system according to claim 12, wherein: each address label processing device includes a color mark printing section for printing a colored mark on a predetermined area on a continuous paper web, said control circuit controlling the color mark printing.

16. An address label preparation processing system according to claim 12, wherein: said address label processing device has a paster for pasting an end of a paper web to a beginning of a roll of paper upstream of said means for printing.

17. An address label preparation processing system according to claim 15, wherein: said address label processing device has a cutter for cutting said paper web on which printing has been carried out.

18. An address label preparation processing system according to claim 16, wherein: said address label processing device includes an address label sorting/folding means on a downstream side of said cutter for sorting address labels.

19. An address label preparation processing system according to claim 12, wherein: said address label processing device includes means for searching through a font memory having bar-code bit patterns stored therein, corresponding to numerical values comprising a bar-code for a specific bar-code bit pattern, and for preparing a compiled sub bit pattern corresponding to a plurality of numerical values based on said bar-code bit pattern, and means for preparing a bar-code bit pattern by expanding said compiled sub bit pattern in a two-dimensional fashion.

* * * * *